United States Patent [19]

Ohashi

[11] Patent Number: 5,568,276
[45] Date of Patent: Oct. 22, 1996

[54] IMAGE SIGNAL RECORDING AND REPRODUCING SYSTEM

[75] Inventor: Kazuhito Ohashi, Kanagawa-ken, Japan

[73] Assignee: Canon Kabushiki Kaisha, Tokyo, Japan

[21] Appl. No.: 342,650

[22] Filed: Nov. 21, 1994

Related U.S. Application Data

[63] Continuation of Ser. No. 56,611, May 3, 1993, abandoned, which is a continuation of Ser. No. 556,955, Jul. 23, 1990, abandoned.

[51] Int. Cl.$^6$ .............................. H04N 5/95; H04N 9/89; H04N 5/78
[52] U.S. Cl. ................... 386/20; 386/13; 386/17; 360/36.2
[58] Field of Search ................... 358/339, 310, 358/323, 324, 332, 319, 320, 325, 342; 360/32, 36.1, 36.2, 37.2, 33.1, 35.1

[56] References Cited

U.S. PATENT DOCUMENTS

| | | | |
|---|---|---|---|
| 4,291,332 | 9/1981 | Kato et al. | 358/19 |
| 4,672,470 | 6/1987 | Morimoto et al. | 358/323 |
| 4,825,299 | 4/1989 | Okada et al. | 358/323 |
| 4,849,833 | 7/1989 | Yoshimura et al. | 360/36.2 |
| 4,887,169 | 12/1989 | Bannai et al. | 358/335 |
| 5,062,005 | 10/1991 | Kitaura et al. | 358/342 |
| 5,119,208 | 6/1992 | Fujimoto | 358/310 |

*Primary Examiner*—Thai Q. Tran
*Assistant Examiner*—Robert Chevalier
*Attorney, Agent, or Firm*—Robin, Blecker, Daley & Driscoll

[57] ABSTRACT

In an image signal recording and reproducing system, a phase reference signal, the phase of which is synchronized with the phase of an image signal, is added to the image signal in a recording mode so as to be recorded on a recording medium, while the phase of a sampling signal for sampling a reproduced image signal is controlled by using the phase reference signal separated from the reproduced signal in a reproducing mode, whereby the image signal can be accurately sampled without an influence from a time variation change in the reproducing side.

5 Claims, 17 Drawing Sheets

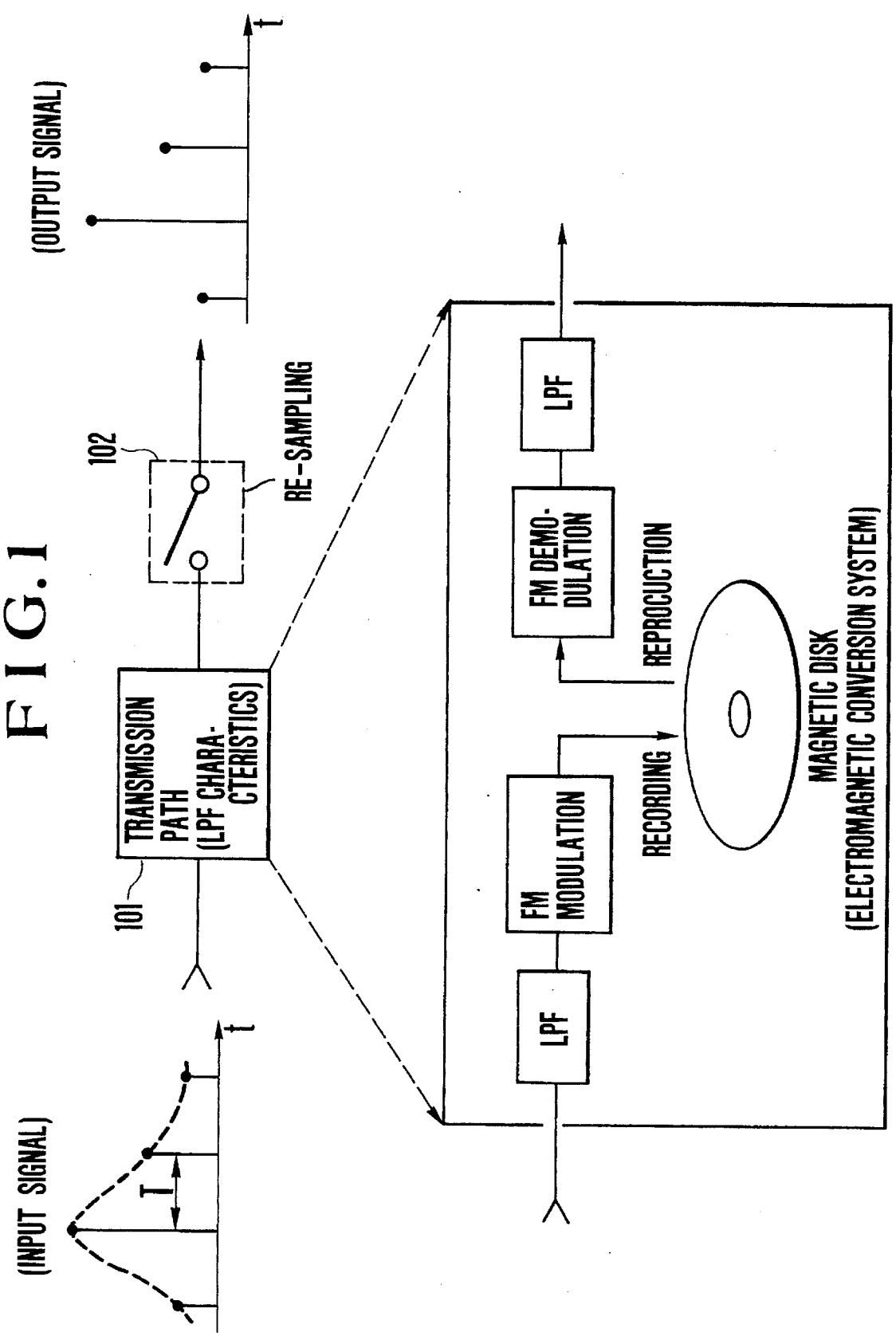

FIG. 2(a) INPUT SIGNAL 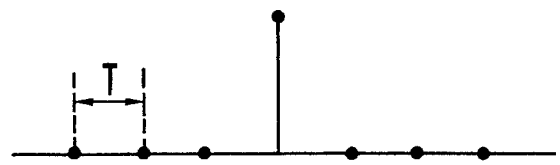
FIG. 2(b) OUTPUT SIGNAL OF TRANSMISSION PATH 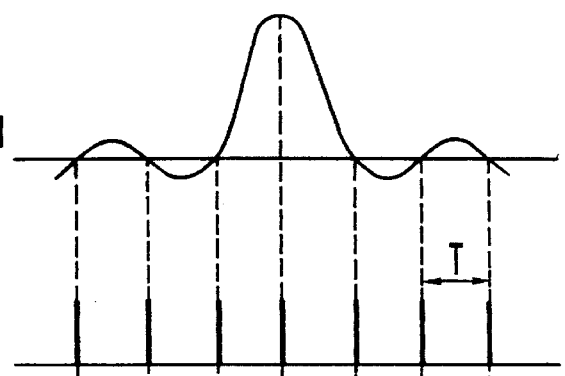
FIG. 2(c) RE-SAMPLING PULSE
FIG. 2(d) OUTPUT SIGNAL (RE-SAMPLED OUTPUT) 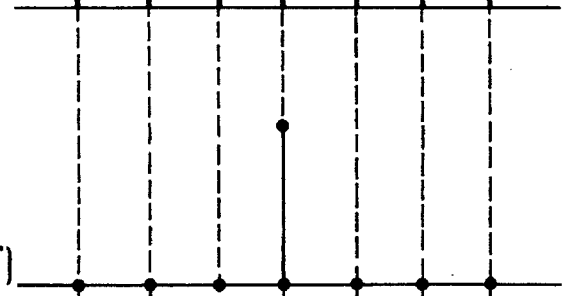
FIG. 2(e) WHEN PHASE OF RE-SAMPLING PULSE IS DEVIATED 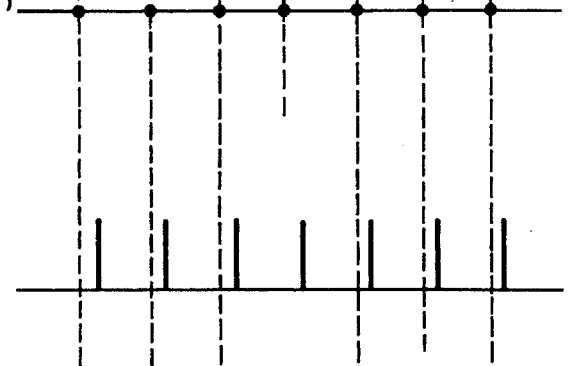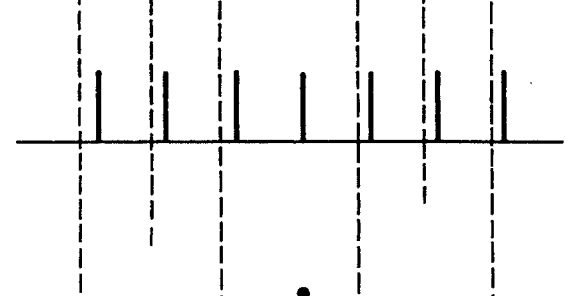
FIG. 2(f) RE-SAMPLED OUTPUT IN CASE OF FIG. 2(e) 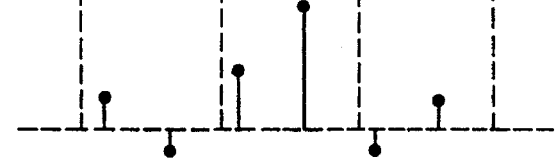

FIG.8

| | FIRST STEP (FIRST TWO-CHANNEL SIMULTANEOUS RECORDING) | SECOND STEP (SECOND TWO-CHANNEL SIMULTANEOUS RECORDING) |
|---|---|---|
| RECORDING TRACK | TRACKS 1, 2 | TRACKS 4, 3 |
| RECORDING SIGNAL | (TRACK 1)<br>$\begin{bmatrix} Y(A_i) \\ C_R(A_i)/C_B(B_i) \end{bmatrix}$<br>(TRACK 2)<br>$\begin{bmatrix} Y(B_i) \\ C_B(B_i)/C_R(A_i) \end{bmatrix}$ | (TRACK 3)<br>$\begin{bmatrix} Y(D_i) \\ C_B(D_i)/C_R(C_i) \end{bmatrix}$<br>(TRACK 4)<br>$\begin{bmatrix} Y(C_i) \\ C_R(C_i)/C_B(D_i) \end{bmatrix}$ |
| OUTPUTS OF IMAGING PORTION ($Y_1, Y_2, R, B$) | $Y_1 = Y(A_i)$<br>$Y_2 = Y(B_i)$<br>$R = R(A_i)$<br>$B = B(B_i)$ | $Y_1 = Y(D_i)$<br>$Y_2 = Y(C_i)$<br>$R = R(C_i)$<br>$B = B(D_i)$ |

WHERE
$\begin{cases} Y(*): \text{SIGNAL Y ON LINE }* \\ C_R(*): \text{SIGNAL } C_R \text{ ON LINE }* \\ C_B(*): \text{SIGNAL } C_B \text{ ON LINE }* \\ R(*): \text{SIGNAL R ON LINE }* \\ B(*): \text{SIGNAL B ON LINE }* \end{cases}$

DRIVE SIGNAL FOR SOLID-STATE IMAGE SENSOR

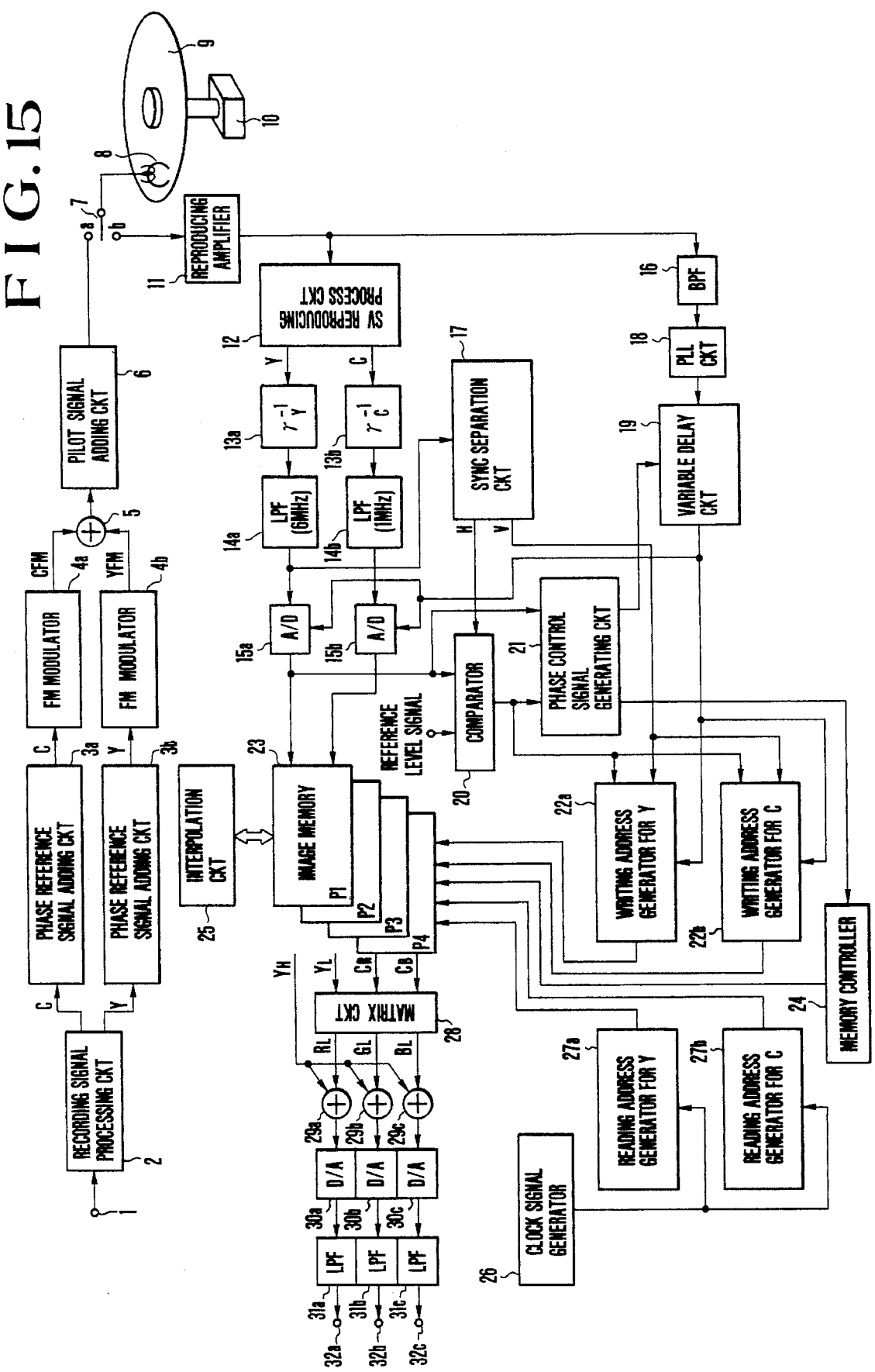

REPRODUCING PHASE REFERENCE SIGNAL fs1

BURST TYPE PHASE REFERENCE SIGNAL

THREE-VALUED PHASE REFERENCE SIGNAL

T: TIME FOR ONE SAMPLE

IMAGE SIGNAL RECORDING AND REPRODUCING SYSTEM

This is a continuation application under 37 CFR 1.62 of prior application Ser. No. 08/056,611 filed on May 3, 1993 (aban.) which is a cont. of Ser. No. 07/556,955 filed on Jul. 23, 1990 (aban.).

BACKGROUND OF THE INVENTION

1. Field of the Invention

This invention relates to an image signal recording and reproducing system for recording an image signal on a recording medium and reproducing the image signal from the recording medium.

2. Description of the Related Art

Hitherto, there has previously been known a still video (to be abbreviated to "SV" hereinafter) system as an apparatus for recording and reproducing a still image signal. The SV system is a system for recording a conventional TV signal on a two-inch magnetic disk after it has been subjected to an FM modulation. However, a system of the type described above is only able to realize a degree of resolution similar to that obtained in the conventional TV system. Furthermore, in the SV system which handles still images, the image printed out by a printer sometimes becomes the final output. In this case, there arises a problem in that the image quality (in particular, the resolution) is unsatisfactory in comparison to that obtainable in a silver-halide photograph.

Recently, novel TV systems such as HDTV (High-Definition TV) have been developed. The HDTV system has about 1,000 scanning lines, the number of which is twice the number of the scanning lines provided for the conventional NTSC system. Furthermore, a signal band in the horizontal direction which corresponds to the 1000 scanning lines is provided for the HDTV system. Therefore, it has been desired that the SV system be so improved that it also has a still image recording and reproducing system which exhibits the image quality of about 1000×1000 pixels (in a square frame) obtainable in the HDTV.

Accordingly, the SV system has been arranged in such a manner that the recording format for the recording medium has been made to be a high band (wide band) recording. However, the image quality must be improved while achieving a certain degree of compatibility between the SV system and a conventional system.

Therefore, it might be considered feasible to employ a CHSV (Compatible High-Definition SV) system capable of highly improving image quality while maintaining compatibility with the conventional system.

The CHSV system will schematically be described.

The CHSV system is based on a technology so-called "an analog transmission of a sample value".

As shown in FIG. 1, the system for analog-transmitting the sample value is characterized by the transmission path characteristics (LPF characteristics) and the re-sampling. That is, an input sample value is again sampled after it has passed though an FM modulation system, an electromagnetic conversion system and an FM demodulation system, so that the sample value is restored.

The principle of the analog transmission of a sample value will be further described with reference to FIGS. 2(a) to 2(f), where a case in which a series of sample values having a period T, as shown in FIG. 2(a), is recorded and reproduced is considered. A transmission path, consisting of an FM modulation system, an FM demodulation system and an electromagnetic conversion system, has low-frequency transmitting characteristics, that is, low-pass filter (LPF) characteristics. FIG. 2(b) illustrates the output of the transmission path. Therefore, when the output of the transmission path is re-sampled by using the resampling pulse having the period T and the correct phase as shown in FIG. 2(c), an output signal shown in FIG. 2(d) can be obtained. That is, the input series of sample values can be correctly reproduced (transmitted). However, if the phase of the re-sampling pulse is, as shown in FIG. 2 (e), deviated, the series of sample values cannot be correctly reproduced (transmitted). As a result, "ringing" is undesirably generated as shown in FIG. 2(f). Therefore, it is necessary for the analog transmission of a sample value to be performed in the reproducing mode (on the receiving side) in such a manner that: (1) Re-sampling pulses having the correct frequency (period) which corresponds to the reproduced (received) sample value signal are generated. (2) Re-sampling pulses having the correct phase which corresponds to the reproduced (received) sample value signal are generated.

Another condition must be met in order to perfectly transmit the sample value signal, that is: (3) The transmission path consisting of the FM demodulation system, the FM demodulation system and the electromagnetic conversion system must have the linear phases, and the frequency characteristics thereof must be the symmetric roll-off characteristics centering the frequency $f_s/2$ ($=\frac{1}{2}T$) where $f_s$ is the sampling frequency. That is, the transmission path must have the LPF characteristics as shown in FIG. 3.

As briefly described above, the sample value is analog-transmitted.

Next, a method of recording a luminance (Y) signal based on the CHSV method will be described.

FIG. 4 illustrates sample points of the signal Y to be recorded on a magnetic disk based on the CHSV method. As shown in FIG. 4, the sample points of the signal Y are distributed in an offset manner so as to be transmitted in a sub-sampling manner. Assuming that 650 (=1300/2) sample points are provided for a line and 500 (=1000/2) sample points are provided for a column, all of the sample points are recorded by using four tracks in such a manner that the sample values included in lines $A_1$, $A_2$, . . . (the rest is omitted) are recorded on one track of the magnetic disk and the sample values included in columns $B_1$, $B_2$, . . . (the rest is omitted) are recorded on another track. The recording of sample points on each of the tracks is performed in accordance with the SV format. FIG. 5 illustrates the allocation of the frequency of the recording signal whose action is arranged to be based on the SV format. As shown in FIG. 5, the baseband widths for signals Y and C become about 7 MHz or lower and about 1 MHz or lower respectively in the SV format.

Assuming that the number of the sample points of the signal Y included in each of the lines is 650, the 650 sample points are recorded during a horizontal effective picture period (53 μsec or less) for an NTSC-TV signal. Therefore, the sampling frequency $f_s$ (see FIG. 3) at this time becomes about 12.2 MHz or less. Thus, the signal Y having the band as shown in FIG. 5 can be recorded.

FIGS. 6(a) and 6(b) illustrate two recording patterns on the magnetic disk performed on the basis of the CHSV method. FIG. 6(a) illustrates a recording pattern when a 2-channel (ch) head is used, while FIG. 6(b) illustrates a recording pattern when a 4ch head is used (however, the recording patterns respectively shown in FIGS. 6(a) and 6(b) can be obtained when the 4ch head is used).

In the case shown in FIG. 6(a), first, the sample values of the signal Y for line $A_i$ (symbol "i" represents a positive integer) and line $B_i$ are simultaneously recorded on the first and second tracks. Then, the 2ch head is shifted to the third and fourth tracks (the shift is not necessary in the case on the 4ch head) so as to simultaneously record the sample values of the signal Y for the lines $D_i$ and $C_i$. In order to keep compatibility with the conventional SV format, the tracks, on which the sample values of the signal Y for the respective lines $D_i$ and $C_i$ are recorded, are inverted with respect to each other.

In a case where the 2ch simultaneous recording operation is performed, there usually arises a problem in terms of crosstalk of the recording signal caused by the head during the recording. However, the problem of this type can be overcome since the known horizontal synchronizing operation is performed between the two heads at the time of the simultaneous recording operation in accordance with the aforesaid recording method.

In a case where the 4ch head is used, a recording operation as shown in FIG. 6(b) may be performed. That is, the sample values of the signal Y for the lines $A_i$ and $B_i$ are first and simultaneously recorded on the first and third tracks. Then, the sample values of the signal Y for the lines $C_i$ and $D_i$ are simultaneously recorded on the second and fourth tracks.

As a result, in the case shown in FIG. 6(a), the frame reproduction according to the conventional SV format can be performed by using the second and third tracks. In the case shown in FIG. 6(b), the frame reproduction according to the conventional SV format can be performed by using the first and second tracks or the third and fourth tracks.

Thus, the signal Y is recorded in accordance with the CHSV method.

Next, a method of recording a color-difference (c) signal based on the CHSV method will be described.

FIGS. 7(a), 7(b) and 7(c) illustrate the relationship between the recording sample patterns of $C_R$ (=R−Y) signal and $C_B$ (=B−Y) signal. In the conventional SV format, the recording band for a color-difference signal in a line-sequential form is one sixth of the signal Y. Therefore, the sample pattern for each of the color-difference signals $C_R$ and $C_B$ to be recorded in accordance with the CHSV method becomes as shown in FIGS. 7(b) and 7(c). The lines of the signal Y to be recorded on the same track on the magnetic disk are designated by symbols $A_i$, $B_i$, $C_1$ and $D_i$ in the right portion of each of FIGS. 7(b) and 7(c). The reason for the existence of the portions, in each of which the line for the signal Y does not coincide with the line for the signal C, lies in the necessity of keeping compatibility with the SV format.

FIG. 8 illustrates the positional relationship between the signals Y and C, where expression "First Step" denotes "2ch simultaneous recording performed at the first time", while expression "Second Step" denotes "2ch simultaneous recording performed at the second time". As described above, in First Step, the recording on the tracks 1 and 2 is performed, while the recording on the tracks 3 and 4 is performed in Second Step. In the case shown in FIG. 8, for example, $Y(A_i)$ (the signal Y consisting of a series of sample values for the signal Y on the line $A_i$ shown in FIG. 7 (a)) and $C_R(A_i)/C_B(B_i)$ are recorded, aforesaid $C_R(A_i)/C_B(B_i)$ being a color-difference line-sequential signal consisting of the signal $C_R$ formed by a series of sample values for the signal $C_R$ on the line $A_i$ shown in FIGS. 7(b) and 7(c) and the signal $C_B$ formed by series of sample values on the line $B_i$, the color-difference line-sequential signal being started with the $C_R$ signal. Referring to FIG. 8, outputs ($Y_1$, $Y_2$, R and B) of an imaging portion are signals which are simultaneously output from the image portion of a CHSV camera to be described later.

Next, the structure of the CHSV camera (an apparatus consisting of the imaging portion and a recording portion) will be described.

FIG. 9 schematically illustrates the structure of the CHSV camera.

As described above, the CHSV camera shown in FIG. 9 records image recording signals for one frame by successively performing the 2ch simultaneous recording twice. In First Step shown in FIG. 8, SV recording process circuits 826 and 827 respectively subject the supplied signals Y and C to a predetermined emphasis and an FM modulation so as to output signals formed by frequency-multiplexing the aforesaid signals. In adders 828 and 829, a pilot signal {the frequency of which is about 2.5 MHz (as is apparent from FIG. 5, the frequency of 2.5 MHz is positioned in the space between FM-Y and FM-C)} obtainable by passing a clock signal through a band-pass filter (BPF) 825 is added to output signals of the SV recording process circuits 826 and 827, the clock signal being generated by a clock generating portion 813 and the pilot signal serving as a reference signal for TBC (time base correction) in the recording mode. Signals output from the adders 828 and 829 are amplified by recording amplifiers 830 and 831 so as to be simultaneously 2ch-recorded on predetermined tracks of the magnetic disk 834 by 2ch heads 832 and 833. In Second Step, the recording operation similar to that performed in the aforesaid First Step is performed after the 2ch heads 832 and 833 have been shifted.

Next, an imaging portion 801 shown in FIG. 9 will be described.

FIG. 10 illustrates the structure of a color filter for use in a solid-state image sensor in a case where the imaging portion 801 comprises one solid-state image sensor. As shown in FIG. 10, the aforesaid color filter is constituted by luminance filters Y disposed in a checkered manner and filters R and B disposed in a line-sequential manner for the residual portions.

FIG. 11 illustrates an example of the structure of the imaging portion including the solid-state image sensor having the color filter constituted as shown in FIG. 10.

Referring to FIG. 11, reference numeral 1301 represents a solid-state image sensor having the color filter shown in FIG. 10, and 1302 to 1305 represent sample-and-hold circuits. In this case, the solid-state image sensor 1301 has about 1300 (horizontal pixels)×1000 (vertical pixels) pixels and is capable of simultaneously reading, two lines apart, signals for two lines which are positioned vertically adjacent to each other.

Referring to FIG. 11, the signal Y ($Y_1$) on the upper line of the signals for the two lines to be simultaneously read is transmitted to signal line (0–1). The signal Y ($Y_2$) for lower line is transmitted to signal line (0–3), the signal R is transmitted to signal line (0–2) and the signal B is transmitted to signal line (0–4).

The sample-and-hold circuits 1302 to 1305 output the aforesaid signals after sample-holding them at predetermined timing.

FIG. 12 illustrates a schematic example of the structure of a case where the solid-state image sensor, which is capable of simultaneously, two lines apart, reading signals for two lines which are positioned vertically adjacent to each other, is constituted by MOS type solid-state image sensors.

The MOS type solid-state image sensor shown in FIG. 12 is an ordinary sensor arranged to act in accordance with a TSL (Transversal Signal Line) method.

Since the MOS type solid-state image sensor is arranged to read signals in accordance with an X-Y address method, the aforesaid two line simultaneous reading can be performed. A detailed description about the reading operation is omitted here.

Next, referring to FIG. 9, the process of inputting signals $Y_1$, $Y_2$, R and B to the SV recording process circuits 826 and 827 will be described for each of the signals Y and C, the signals $Y_1$, $Y_2$, R and B being produced by the imaging portion 801 which is driven by an imaging portion drive circuit 808 in synchronization with a synchronizing signal output from the clock generating portion 813.

As for the signal Y, the aforesaid signals $Y_1$ and $Y_2$ (see FIG. 8) output from the imaging portion 801 pass through LPFs 802 and 805, each of which has a passing frequency band of about 6 MHz, and gamma correction ($\gamma_Y$) circuits 821 and 823 so as to be supplied to the SV recording process circuits 826 and 827.

The $\gamma_Y$ circuits 821 and 823 are transmission path gamma correction circuits provided for the purpose of improving signal-to-noise ratio in dark portions of a luminance signal and keeping compatibility with the conventional SV format.

As for the signal C, the aforesaid signals R and B (see FIG. 8) output from the imaging portion 801 pass through the LPFs 804 and 807, each of which has a passing transmission frequency band of 1 MHz, so as to be supplied to switch circuits $S_1$ and $S_2$. The switch circuits $S_1$ and $S_2$ are arranged to be switched on/off every 1H so that color line-sequential signals R/B (the output of the switch circuit $S_1$) and B/R (the output of the switch circuit $S_2$) are obtained.

In subtracters 809 and 810, the signal $Y_1$ output from the LPF 803 having the passing frequency band of 1 MHz and the signal $Y_2$ output form the LPF 806 having the passing frequency band of 1 MHz are subtracted from the outputs of the switch circuits $S_1$ and $S_2$, respectively. As a result, the color-difference line-sequential signal $C_R/C_B$ is output from the subtracter 809 and the color-difference line-sequential signal $C_B/C_R$ is output from the subtracter 810.

Then, the aforesaid signals are sampled by sample-and-hold circuits 811 and 812 so as to form the sample patters for the signals $C_R$ and $C_B$ shown in FIGS. 7(b) and 7(c). The sampling clock used at this time is generated by the clock generating portion 813.

Signals output from the sample-and-hold circuits 811 and 812 pass through LPFs 819 and 820 and gamma correction ($\gamma_c$) circuits 822 and 824 so as to be supplied to the SV recording process circuits 826 and 827.

Next, the reproducing method will be described. FIG. 13 illustrates the schematic structure of a reproducing apparatus arranged to act in accordance with the CHSV method. A signal, reproduced from a magnetic disk 1501 serving as a recording medium by a magnetic head 1502, is amplified by a reproducing amplifier 1503 so as to be supplied to an SV reproducing process circuit 1504. In the SV reproducing process circuit 1504, the supplied signal is subjected to a separation process in which the luminance signal Y and the color-difference line-sequential signal C are separated from each other, subjected to an FM demodulation and to a deemphasis so that reproduced signals Y and C are output. The aforesaid two signals are gamma-inverse converted by gamma-inverse converters 1506 and 1507, and then the bands of the signals are restricted by the LPFs 1508 and 1509, respectively. Then, the signals pass through analog-to-digital (A/D) converters 1513 and 1514, respectively, so as to be supplied to an image memory 1515. The sampling clocks for use in the A/D converters 1513 and 1514 are formed by, first, extracting a pilot signal, which has been previously frequency-multiplexed in the recording mode, from a signal reproduced from the magnetic disk 1501, the extracting being performed by a band-pass filter (BPF) 1505. Then, the pilot signal and a synchronizing signal which has been separated by a sync separation circuit 1510 are used so as to form the sampling clock by sampling-clock generating circuits 1511 and 1512.

The aforesaid process is applied to the four tracks on the magnetic disk 1501 so that sample data output from the A/D converters 1513 and 1514 is stored on the address on the image memory 1515 designated by the address generators 1517 and 1518. The image processing circuit 1515 performs an interpolation by using the sample data stored in the image memory 1515. Then, the signals are read out from the image memory 1515 in a state in which the high-frequency component signal ($Y_H$), the low-frequency component signal ($Y_L$) and color-difference signals ($C_R$ and $C_B$) are separated from one another. As a result, signals $Y_L$, $C_R$ and $C_B$ are, as illustrated, supplied to a matrix circuit 1519 so as to be converted into three primary color signals ($R_L$, $G_L$ and $B_L$). Then, the high-frequency component ($Y_H$) of the signal Y is added to each of the three primary color signals ($R_L$, $G_L$ and $B_L$) by adders 1520, 1521 and 1522 so as to be converted into analog signals by digital-to-analog (D/A) converters 1523, 1524 and 1525. As a result, the analog signals are output in the form of an RGB signal.

In the case of the CHSV method in which the sample value is analog-transmitted as described above, it is necessary to generate a correct re-sampling clock. Therefore, a sampling clock the phase of which is synchronized with the pilot signal reproduced from the magnetic disk is formed so as to be used for re-sampling the image signal reproduced from the magnetic disk and FM-demodulated. Furthermore, the image signal is stored in the memory in accordance with the aforesaid re-sampling clock so as to absorb jitters. In addition, when the image signal which has been re-sampled by the re-sampling clock is stored in the memory, the horizontal address for the image signal storing memory is reset in synchronization with a horizontal synchronizing signal and a vertical synchronizing signal added to the FM-demodulated image signal.

In a case where the aforesaid structure is employed, if the synchronizing signal portion of the demodulated image signal generates distortion of its waveform as shown in FIG. 14(a) or if the SN ratio is unsatisfactory, the disorder of the time base of the edge portion of the waveform cannot be prevented by only shaping the waveform, as shown in FIG. 14(b). As a result, when the horizontal address of the image signal storing memory is reset at the timing of the edge portion of the horizontal signal, the image signal may be stored in an address deviated from a normal address of the memory. Therefore, if the image signal which has been stored in the wrong address of the memory is read by using a correct reading clock signal, the reproduced signal would inevitably generate distortion. As a result, the original image cannot be accurately restored.

When the magnetic disk subjected to the recording by the CHSV camera is subjected to the reproduction by a reproducing apparatus structured in accordance with the CHSV method, there arise the following problems:

When the magnetic disk subjected to the recording by the CHSV camera is subjected to the reproduction by a reproducing apparatus structured in accordance with the CHSV method, the "correct re-sampling phase" which is one of the aforesaid conditions to realize the analog transmission of a sample value cannot be achieved only by the pilot signal recorded on the magnetic disk in the frequency multiplexed manner.

That is, the CHSV camera is arranged in such a manner that the processing system for the image signal and the system for the pilot signal are composed of different circuits and filters. Therefore, the relationship in terms of time delicately differ between the image signal and the pilot signal depending upon the kind of the CHSV camera which performs the recording.

Therefore, when the magnetic disk subjected to the recording by a predetermined CHSV camera is subjected to the reproduction, the adjustment of the re-sampling phase in the reproducing apparatus by forming the re-sampling clock signal the phase of which has been synchronized with the TBC pilot signal, must be performed again if a magnetic disk subjected to the recording by another CHSV camera is subjected to the reproduction. As a result, if the point, which is re-sampled by the re-sample clock signal in the reproducing mode, deviates from the sample point in the recording mode, the aforesaid condition for analog-transmitting the sample value cannot be satisfied. Therefore, the quality of the reproduced image deteriorates. Accordingly, there arises a desire of a structure capable of automatically adjusting the re-sample phase. However, there has not been reference information acting to automatically adjust the re-sample phase for use in the conventional CHSV camera.

SUMMARY OF THE INVENTION

An object of the present invention is to provide an image signal recording and reproducing system capable of solving the aforesaid problem.

Another object of the present invention is to provide an image signal recording and reproducing system capable of accurately sampling an image signal reproduced in the reproducing mode.

In order to achieve the aforesaid objects, an aspect of the present invention lies in an image signal recording and reproducing system for recording an image signal on a recording medium and reproducing the image signal from the recording medium on which the image signal has been recorded, comprising: phase reference signal generating means for generating a phase reference signal the phase of which is synchronized with the phase of the image signal; phase reference signal addition means for receiving the image signal and adding said phase reference signal generated by the phase reference signal generating means to the supplied image signal; and recording means for recording the image signal, to which the phase reference signal has been added by the phase reference signal addition means, on the recording medium.

Another object of the present invention is to provide an image signal recording and reproducing system capable of avoiding an influence from the time base variation generated in the reproducing mode and capable of accurately sampling an image signal reproduced from a recording medium.

In order to achieve the aforesaid object, an aspect of the present invention lies in an image signal recording and reproducing system for recording an image signal on a recording medium and reproducing the image signal from the recording medium on which the image signal has been recorded, comprising: reproducing means for reproducing the image signal which has been recorded on the recording medium and to which a phase reference signal has been added; phase reference signal separation means for separating the phase reference signal from the reproduced image signal; sampling signal generating means for generating a sampling signal for sampling the image signal reproduced from the recording medium; and phase control means for controlling the phase of the sampling signal generated by the sampling signal generating means by using the phase reference signal separated from the reproduced image signal by the phase reference signal separation means.

Other and further objects, features and advantages of the invention will appear more fully from the following description with reference to the accompanying drawings.

BRIEF DESCRIPTION OF THE DRAWINGS

FIG. 1 illustrates an analog transmission system for a sample value;

FIGS. 2(a), 2(b), 2(c), 2(d), 2(e) and 2(f) illustrate the principle of analog-transmitting the sample value;

FIG. 8 illustrates the positional relationship between the recording tracks on the recording medium for the signals Y and C;

FIG. 15 illustrates the schematic structure of a first embodiment of the present invention arranged in such a manner that the present invention is applied to a recording and reproducing apparatus of an electronic still video system structured in accordance with the CHCV method;

DETAILED DESCRIPTION OF THE PREFERRED EMBODIMENTS

Preferred embodiments of the present invention will be described.

FIG. 15 illustrates an embodiment of the present invention is which the present invention is applied to a recording and reproducing apparatus of an electronic still video system which is arranged to act on the basis of a CHSV method.

Figure 16:
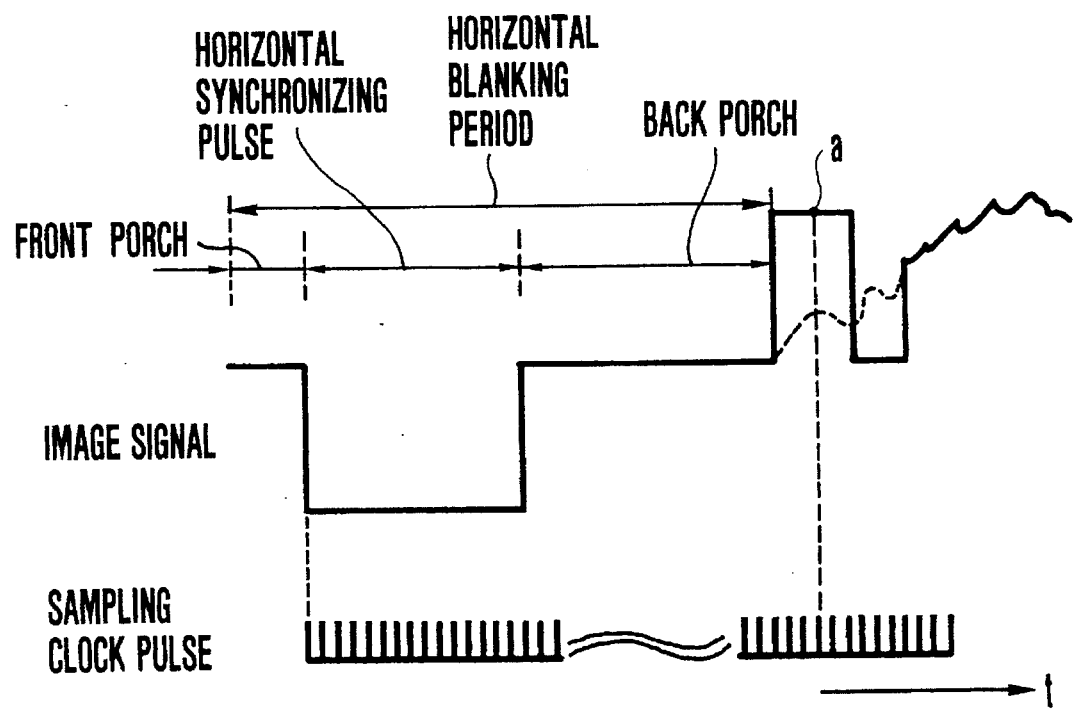
FIG. 16 illustrates the waveform of an image signal to which a phase reference signal is added.

Referring to FIG. 15, an image signal received by an image signal input terminal 1 is converted into a luminance (Y) signal and a color-difference line-sequential (C) signal by a recording signal processing circuit 2. Phase reference signals as shown in FIG. 16 are added to the signals Y and C by phase reference signal adding circuits 3a and 3b. The phase reference signal is added to the beginning portion of the image signal immediately after the back porch of the synchronizing signal portion. The position at which the phase reference signal is added is determined in such a manner that the central point of the phase reference signal, that is, point "a" shown in FIG. 16 becomes a point which is the point after a lapse of predetermined sampling interval from, for example, the rise of a horizontal synchronizing signal. In the case of the signal C having no synchronizing signal portion, the phase reference signal is added to the same at the same timing as the signal Y. The Y and C signals, to which the phase reference signal has been respectively added, are FM-modulated by FM modulators 4a and 4b before the Y and C signals are frequency-multiplexed by an adder 5. Then, a continuous pilot signal is added to the frequency-multiplexed signal by a pilot signal adding circuit 6 so as to be recorded on a magnetic disk 9 by a magnetic head 8, the magnetic disk 9 being rotated by a motor 10 at a predetermined rotating speed. At this time, a recording/ reproducing changeover switch 7 is connected to the recording side (side "a" shown in the drawing) by a system controller (omitted from the illustration).

In the reproducing mode, the recording/reproducing changeover switch 7 is connected to the reproduction side (side "b" shown in the drawing) by the system controller (omitted from the illustration). As a result, the signal reproduced from the magnetic disk 9 by the magnetic head 8 is supplied to an SV reproducing process circuit 12 after the signal has been amplified by a reproducing amplifier 11. In the SV reproducing process circuit 12, the luminance signal Y and the color-difference line-sequential signal C are separated from each other, and an FM modulation and a deemphasis are performed so that a reproduced signal Y and a reproduced signal C are output. The two reproduced signals Y and C are gamma-inverse converted by gamma-inverse converters 13a and 13b before their bands are limited by LPFs 14a and 14b, respectively. The two signals are respectively digitized by analog-to-digital (A/D) converters 15a and 15b before being supplied to an image memory 23. The clock signal in each of the A/D converters 15a and 15b is formed by extracting, by a band-pass filter (BPF) 16, the pilot signal which has been frequency-multiplexed in the recording mode from the signal reproduced from the magnetic disk 9, and by using the pilot signal and a synchronizing signal which has been separated by a sync separation circuit 17.

Next, the operation of forming the clock signal for the A/D converters 15a and 15b will be described. The reproduced signal, which has been amplified by the reproducing amplifier 11, is supplied to the BPF 16. The BPF 16 separates the pilot signal which has been frequency-multiplexed in the recording mode from the reproduced signal supplied thereto so that the pilot signal is supplied to a PLL (a Phase-Locked Loop) circuit 18.

The PLL circuit 18 generates a clock signal the phase of which is arranged to be in synchronization with the pilot signal so as to be supplied to a variable delay circuit 19.

This embodiment is arranged in such a manner that the position at which the sampling is performed in the recording mode and the position at which the sampling is performed in the reproducing mode are accurately allowed to coincide with each other by making the phase reference signal, to be added in the recording mode, and the clock signal, to be output from the PLL circuit 18, to be in phase each other.

Next, an operation of controlling the phase of the clock signal to be output from the PLL circuit 18 will be described with reference to FIG. 17.

The variable delay circuit 19 supplies the clock signal supplied from the PLL circuit 18 to the A/D converters 15a and 15b without delaying the clock signal. The A/D converter 15a digitized the signal Y supplied from the LPF 14a in response to the supplied clock signal so as to supply the digital signal Y to a comparator 20.

The comparator 20 has been supplied with a horizontal synchronizing signal H separated from the signal Y output from the LPF 14a by the sync separation circuit 17. The comparator 20 therefore makes a comparison between the level of a reference level signal supplied from a reference level signal generator (omitted from the illustration) and that of the digital signal Y, the comparison being made during a predetermined period defined by the supplied horizontal synchronizing signal, that is, during a period including the phase reference signal. If a digital signal Y the level of which is higher than a reference level shown by the reference level signal is detected, the comparator 20 outputs a detection pulse.

Figure 17:
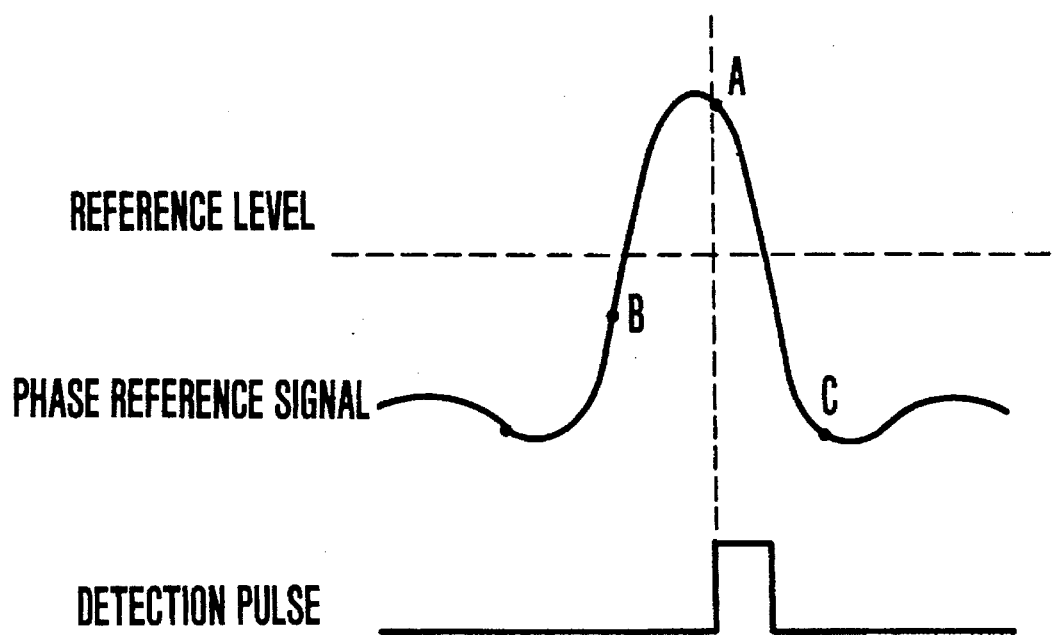
FIG. 17 illustrates a state where the phase reference signal deviates from the sampling point represented by a clock signal.

As shown in FIG. 17, in synchronization with the timing at which the digital signal Y is output from the A/D converter 15a at a sample point A of sample points (points A to C shown in the drawing) for the digital signal Y output from the A/D converter 15a showing a higher level than the level shown by the above-described reference level signal, the comparator 20 outputs the detection pulse as illustrated.

On the other hand, the digital signal Y output from the A/D converter 15a is also supplied to a phase control signal generating circuit 21. The phase control signal generating circuit 21 detects the digital signal Y which corresponds to the sampling points A, B and C shown in FIG. 17 in synchronization with the supply of the detection pulse from the comparator 20. The phase control signal generating circuit 21 performs an operation (A–B)–(A–C), where symbols A, B and C respectively denote the levels of the sampling points shown in FIG. 17. As a result, the phase control signal generating circuit 21 supplies a control signal, which corresponds to the result of the operation, to the variable delay circuit 19.

Figure 18:
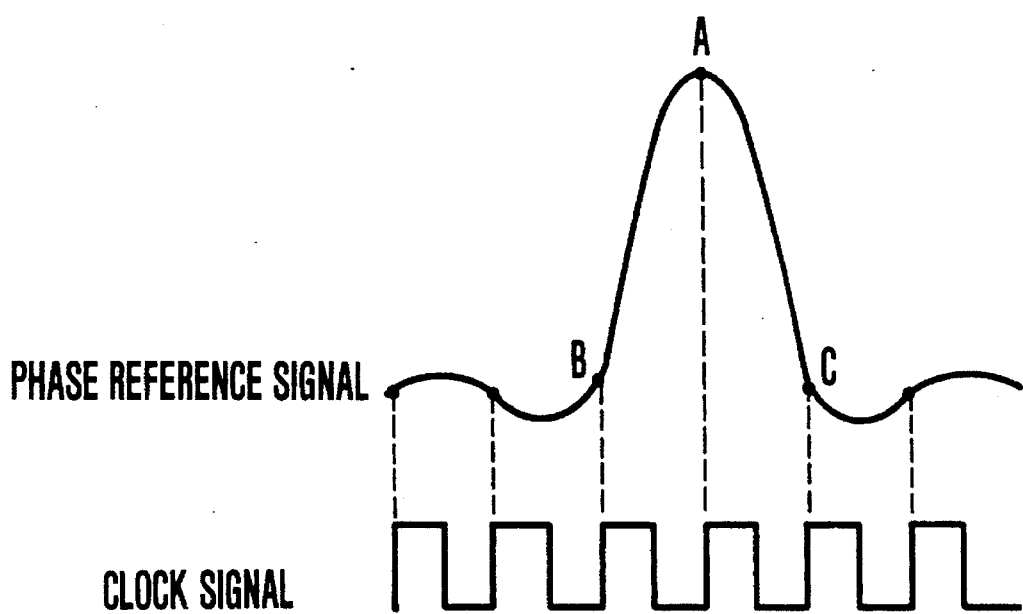
FIG. 18 illustrates a state where the phase reference signal coincides with the sampling point represented by a clock signal.

The variable delay circuit 19 controls the quantity of the delay of the clock signal in response to the control signal supplied from the phase control signal generating circuit 21 in such a manner that the central point of the phase reference signal, that is, the level peak point is, as shown in FIG. 18, allowed to coincide with the sampling point represented by the clock signal.

The clock signal, the phase of which has been allowed to coincide with the phase reference signal added in the recording mode, is supplied to the A/D converters 15a and 15b and writing address generators 22a and 22b.

The A/D converters 15a and 15b respectively digitize the reproduced signals Y and C supplied from the LPFs 14a and 14b in response to the clock signal the phase of which has been corrected by the variable delay circuit 19 so as to supply the digitized reproduced signals Y and C to the image memory 23.

In synchronization with the clock signal the phase of which has been corrected in the variable delay circuit 19, the writing address generators 22a and 22b respectively specify the writing addresses of the image memory 23 so as to write the digital signals Y and C output from the A/D converters 15a and 15b into the image memory 23. The writing address generator 22a outputs the writing address data for the digital signal Y, while the writing address generator 22b outputs the writing address data for the digital signal C.

The detection pulse generated by the comparator 20 is supplied to the writing address generators 22a and 22b. Furthermore, vertical synchronizing signal V separated from the reproduced signal Y output from the LPF 14a by the sync separation circuit 17 is supplied to the writing address generators 22a and 22b. The writing address generators 22a and 22b each include a horizontal address counter and a vertical address counter which are, as described above, counted up in synchronization with the clock signal. The writing address generators 22a and 22b reset the horizontal address counter by the detection pulse supplied from the comparator 20, while they reset the vertical address counter in response to the vertical synchronizing signal supplied from the sync separation circuit 17.

The start and completion of the data writing operation and the data reading operation performed to and from the image memory 23 are controlled by a memory controller 24. For the period in which the quantity of the delay of the variable delay circuit 19 is being controlled by the control signal generated by the phase control signal generating circuit 21 and the phase of the clock signal thereby is being corrected, a write inhibition signal is supplied from the phase control signal generating circuit 21 to the memory controller 24. The memory controller 24 inhibits data from being written into the image memory 23 during the period in which the write inhibition signal is output from the phase control signal generating circuit 21. When the outputting of the write inhibition signal from the phase control signal generating circuit 21 is stopped, that is, the correction of the clock signal has been completed, the memory controller 24 enables data to be written into the image memory 23. As a result, the digital signals Y and C output from the A/D converters 15a and 15b are written in the addresses on the image memory 23 specified by the writing address generators 22a and 22b.

After the aforesaid operations of reproducing data from the magnetic disk 9 and writing data into the image memory 23 have been completed for four tracks on the magnetic disk 9, an interpolation circuit 25 forms interpolated image data, which corresponds to an image signal which has not been recorded on the magnetic disk 9, by using image data which corresponds to the image signal stored in the image memory 23 and recorded on the magnetic disk 9. The interpolated image data thus formed is stored in the image memory 23.

After the image memory 23 has stored the image data and the interpolated image data, the memory controller 24 brings the image memory 23 into a reading state. Furthermore, the memory controller 24 specifies a reading address on the image memory 23 by using the reading address generators 27a and 27b in response to an accurate clock signal output from a clock signal generator 26 and having no time base variation. As a result, image data stored in the image memory 23 is read out while being separated into a high-frequency component ($Y_H$) of the signal Y, a low-frequency component ($Y_L$) of the signal Y and two kinds of color-difference signals ($C_R$ and $C_B$). The signals $Y_L$, $C_R$ and $C_B$ are supplied to a matrix circuit 28 in which the signals $Y_L$, $C_R$ and $C_B$ are converted into three primary color signals ($R_L$, $G_L$ and $B_L$). Then, the signal $Y_H$ read from the image memory 23 is added to the signals $R_L$, $G_L$ by adders 29a, 29b and 29c so as to be converted into three-primary color analog signals (R, G and B) by digital-to-analog (D/A) converters 30a, 30b and 30c. After excessive components have been removed by LPFs 31a, 31b and 31c, the signals R, G and B are output from output terminals 32a, 32b and 32c.

As described above, according to this embodiment, the image signal reproduced from the magnetic disk is temporarily stored in the memory in synchronization with the clock signal generated at the time of the reproducing operation and including a time base variation. Then, the image signals for one picture, recorded separately on the four tracks on the magnetic disk, are reconstituted on the memory so that the image signals stored in the memory are read out in synchronization with the accurate clock signal having no time base variation. As a result, the pilot signal recorded, together with the image signal, on the magnetic disk is separated from the reproduced signal when the time base variation generated in the reproduced image signal in the reproduction mode is canceled. Then, a clock signal the phase of which is synchronized with the separated pilot signal is formed. Also, the phase of the clock signal is corrected by using the phase reference signal added to the image signal in the recording mode. Furthermore, the writing address for the memory is specified without using the horizontal synchronizing signal separated from the reproduced image signal, but the specifying of the writing address is performed in synchronization with the reproduction timing of the phase reference signal added to the image signal in the recording mode and recorded on the magnetic disk. The reproduced image signal is stored in the memory in synchronization with the clock signal the phase of which has been corrected. As a result, the image signal recorded on the magnetic disk can be accurately reproduced in the form of an image signal having no time base variation.

Although a rectangular wave signal as shown in FIG. 16 is employed as the phase reference signal according to this embodiment, another kind of wave signal may be employed, resulting in the similar effect being obtained.

As described above, according to this embodiment, an image signal recording and reproducing apparatus capable of accurately reproducing the original image signal from the signal recorded on a recording medium can be provided.

Figure 3:
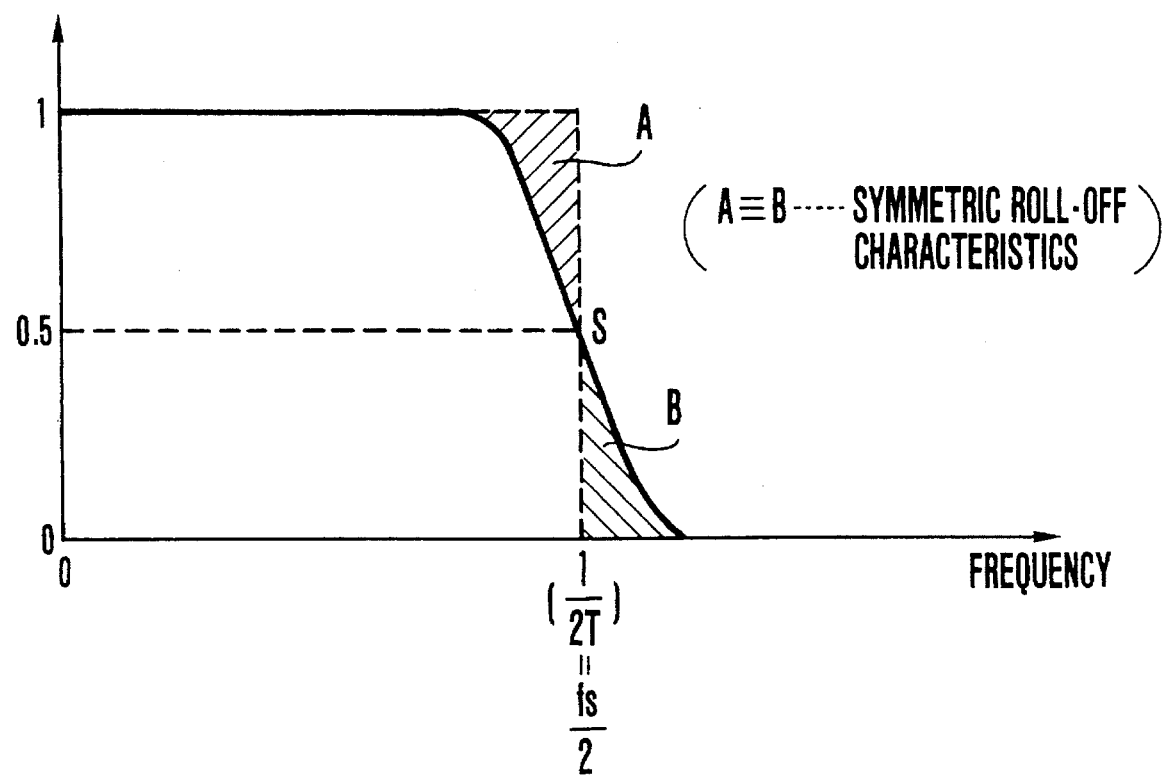
FIG. 3 illustrates the transmission path characteristics for analog-transmitting the sample value.
Figure 4:
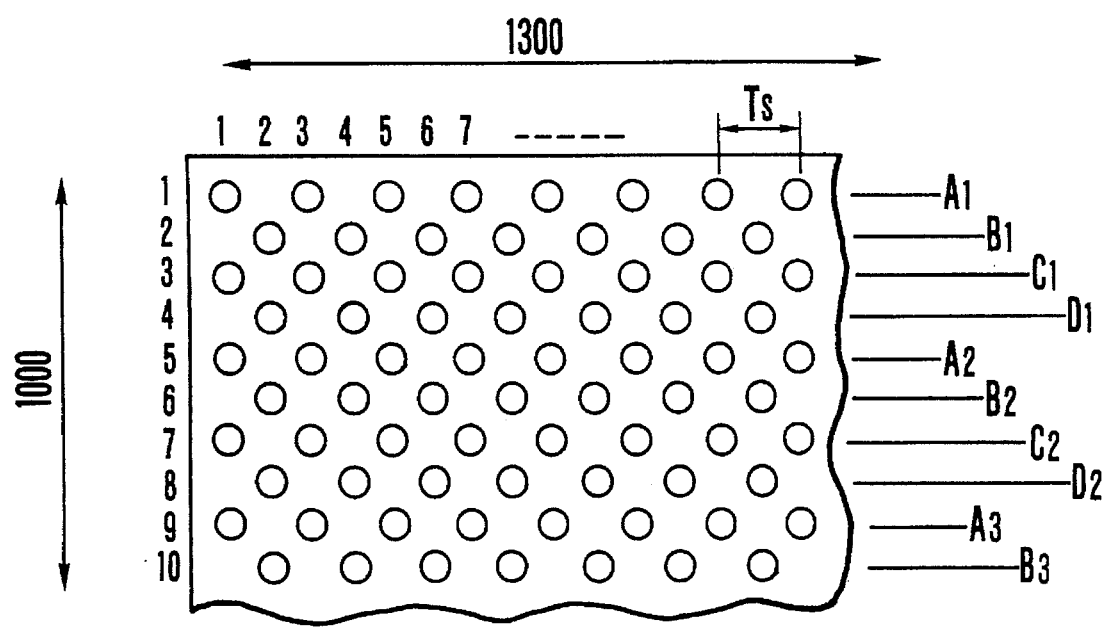
FIG. 4 illustrates sample points for the signal Y to be recorded on a recording medium.
Figure 5:
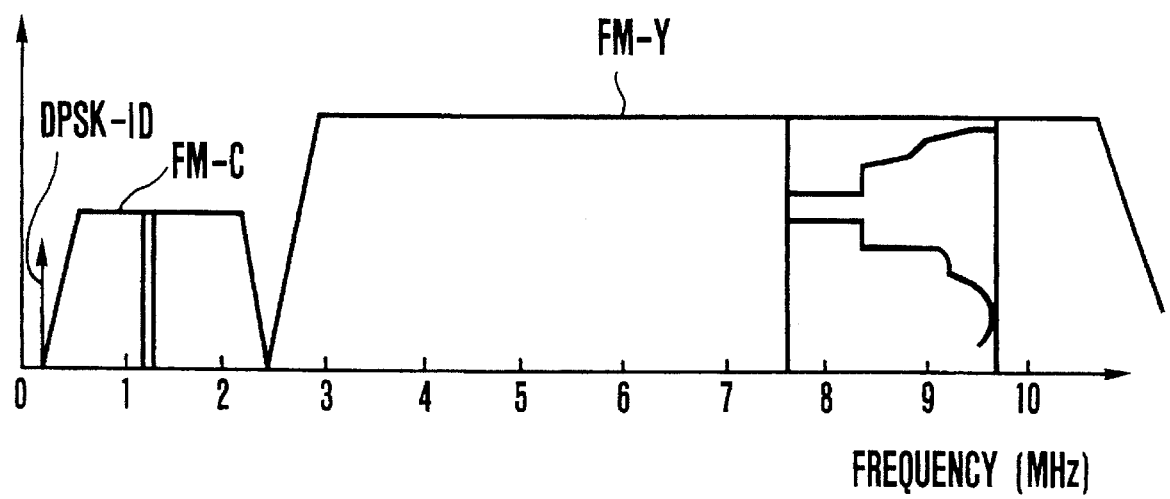
FIG. 5 illustrates the frequency allocation of a recording signal in an SV format.
Figure 9:
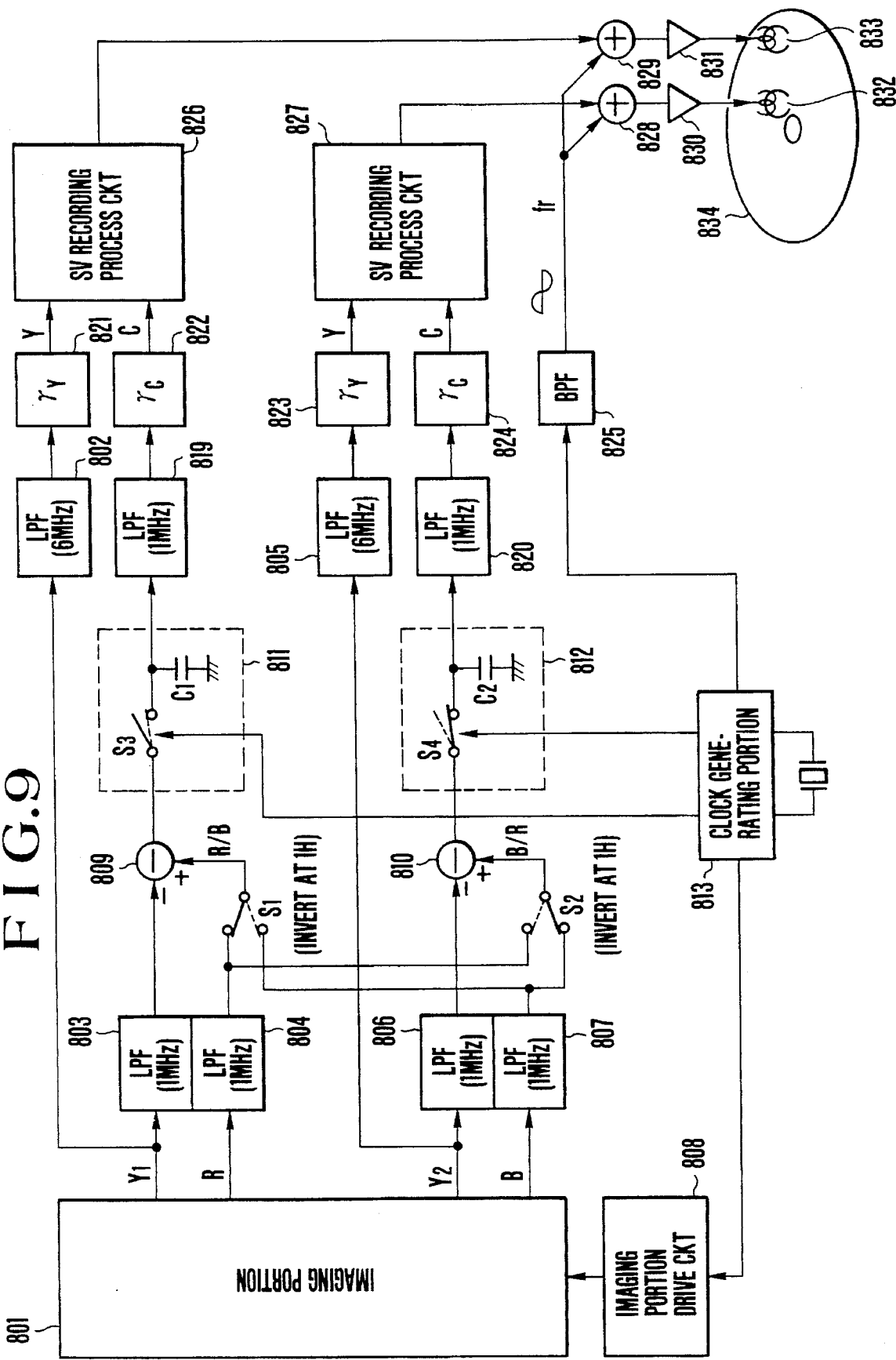
FIG. 9 is a block diagram which illustrates the main structure of a recording system for a CHSV camera.
Figure 10:
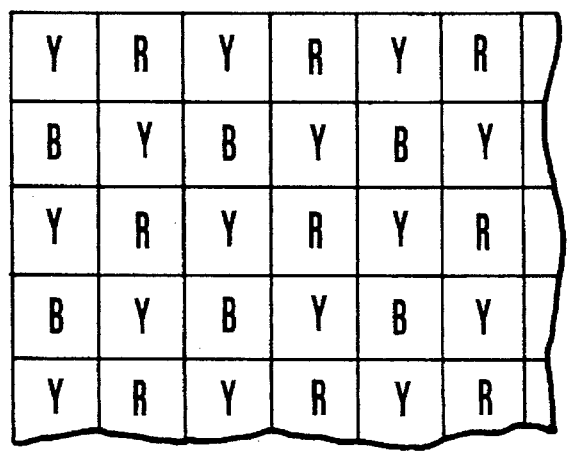
FIG. 10 illustrates an example of the structure of a color filter having an imaging portion constituted by one solid-state image sensor.
Figure 11:
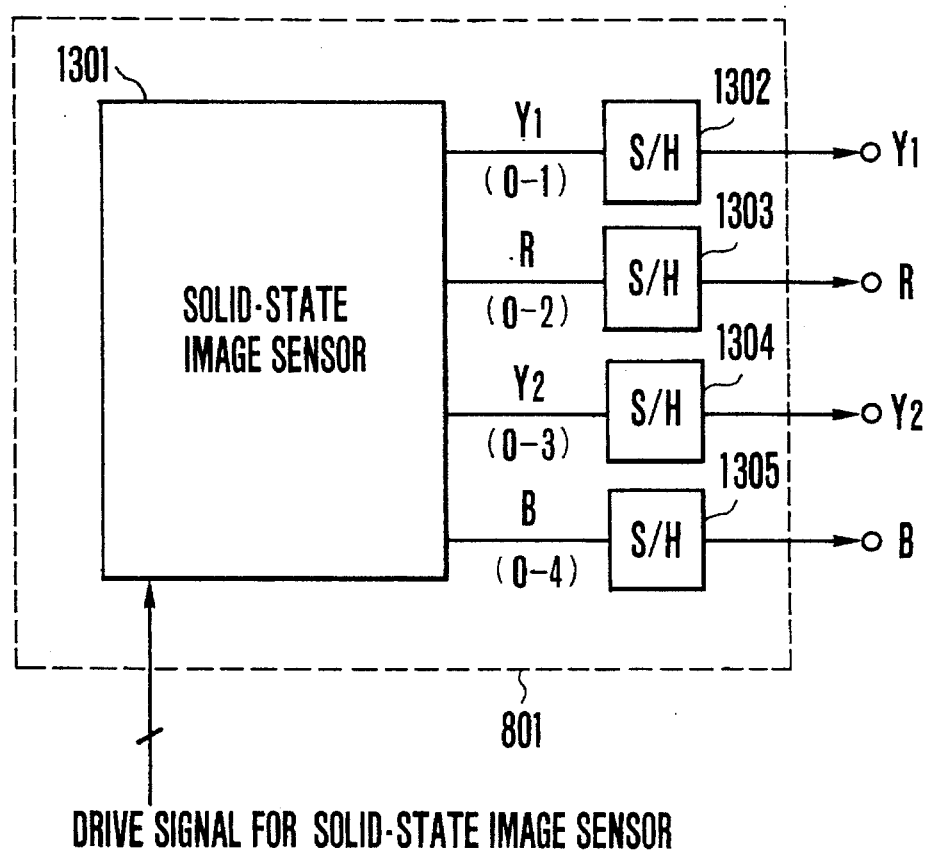
FIG. 11 illustrates the structure of an imaging portion having the color filter the structure of which is arranged as shown in FIG. 10.
Figure 12:
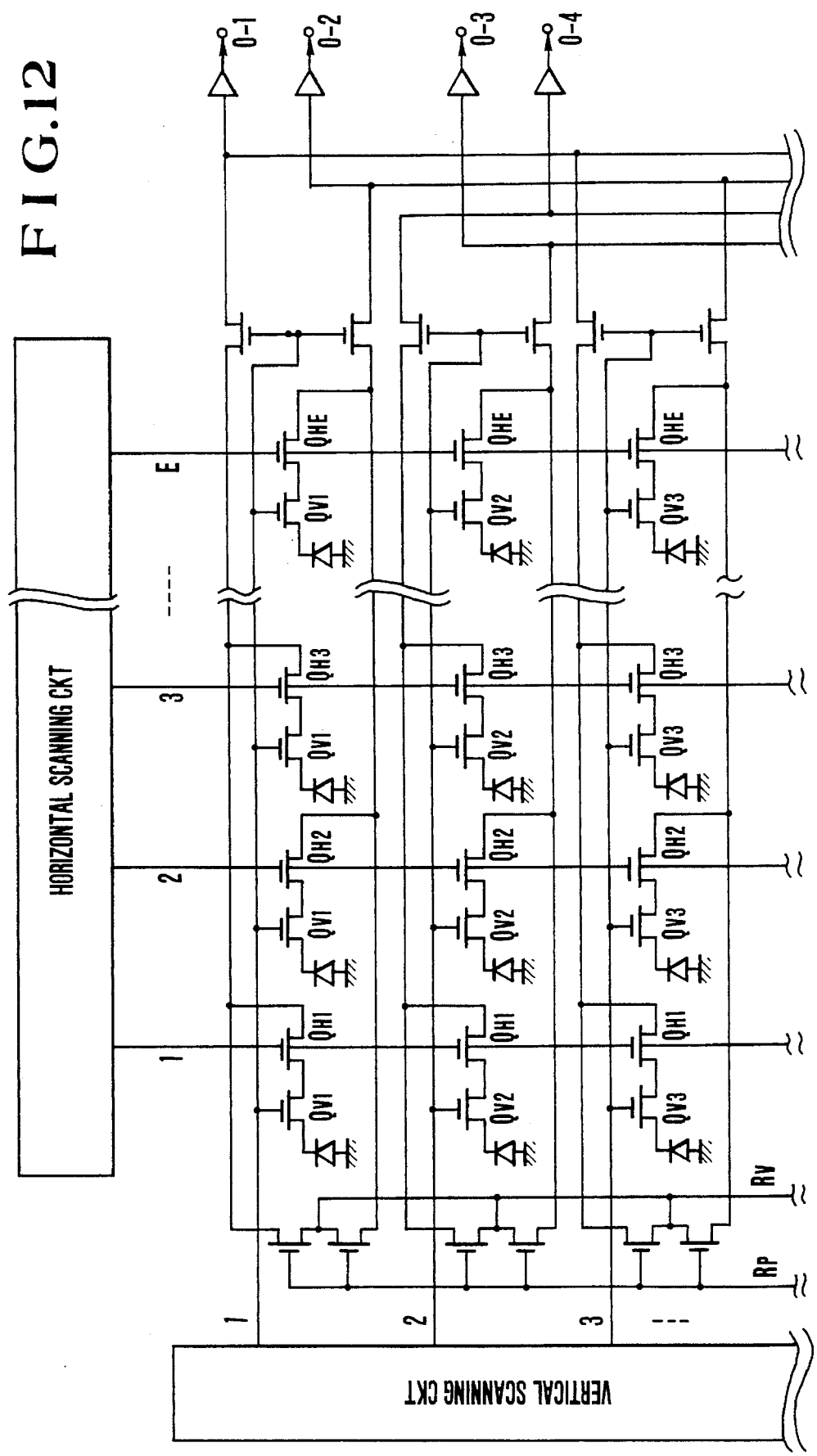
FIG. 12 illustrates the structure of a MOS type solid-state image sensor capable of simultaneously reading signals for adjacent two lines every other two lines.
Figure 19:
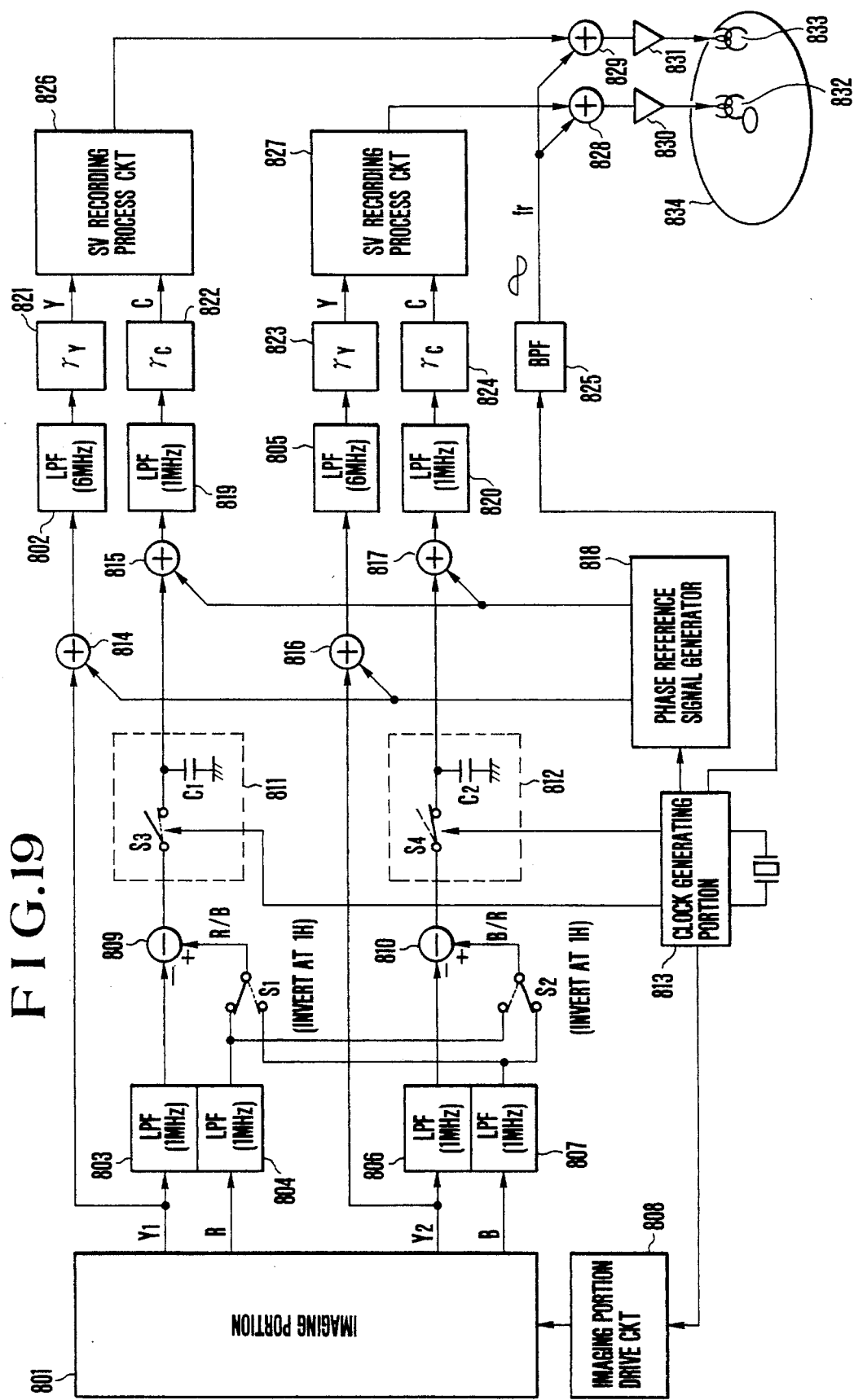
FIG. 19 is a block diagram which illustrates the main structure of the recording system of the CHSV camera according to a second embodiment of the present invention.

FIG. 19 is a block diagram which illustrates an essential portion of a CHSV camera according to a second embodiment of the present invention. The same elements as those shown in FIG. 9 are given the same reference numerals. In the CHSV camera shown in FIG. 19, recording of image signals for one picture is completed by successively performing the simultaneous recording in two channels two times. In First Step shown in FIG. 8, SV recording process circuits 826 and 827 subject the supplied signals Y and C to a predetermined emphasis and an FM modulation before outputting the frequency-multiplexed signals Y and C. Adders 828 and 829 successively add, as a reference signal for TBC (Time Base Correction) in the reproduction mode, pilot signals (the frequency each of which is about 2.5 MHz which is, as is apparent from FIG. 5, in unused range between FM-Y and FM-C) to the output signal of each of the SV recording process circuits 826 and 827, the pilot signal being obtained by passing the clock signal generated by the clock generating portion 813 through a band-pass filter (BPF) 825. Signals output from the adders 828 and 829 are amplified by respective recording amplifiers 830 and 831 so as to be simultaneously two-channel recorded on predetermined tracks of a magnetic disk 834 by two-channel heads 832 and 833. In Second Step, the two-channel heads 832 and 833 are shifted, and then the recording operation is performed similarly to the aforesaid First Step.

Then, referring to FIG. 19, the process of inputting signals $Y_1, Y_2$, R and B to the SV recording process circuits 826 and 827 will be described for each of the signals Y and C, the signals $Y_1, Y_2$, R and B being produced by an imaging portion 801 which is driven by an imaging portion drive circuit 808 in synchronization with a synchronizing signal output from the clock generating portion 813.

Figure 20:
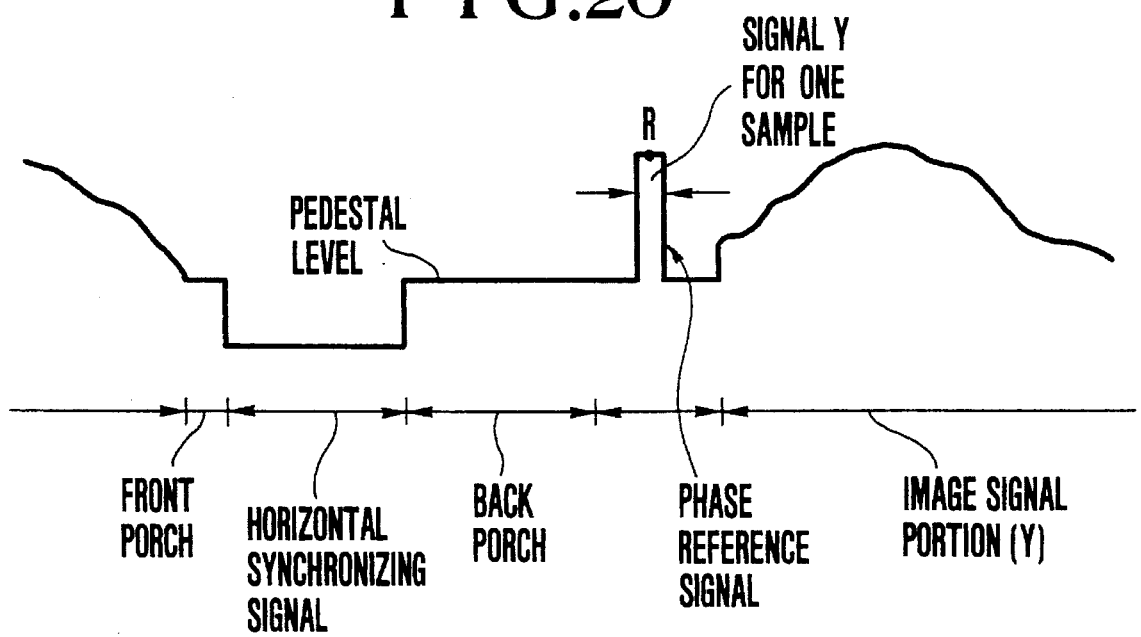
FIG. 20 illustrates the waveform of luminance signal after the phase reference signal has been added.

As for the signal Y, phase reference signals output from a phase reference signal generator 818 are, by respective adders 814 and 816, added to signals $Y_1$ and $Y_2$ output from the imaging portion 801. The phase reference signal serves as a phase reference at the time of the re-sampling operation performed in the reproduction mode to be described later. It might be considered feasible to employ an arrangement in which one phase reference signal is added every 1H (symbol H represents a horizontal synchronizing period) and another arrangement in which the same is added every 1V (symbol V represents a vertical synchronizing period). FIG. 20 illustrates a case in which one phase reference signal is added every 1H. As shown in FIG. 20, the phase reference signal is a rectangular signal for one sample. Referring to that drawing, symbol R represents a phase reference point.

The signals $Y_1$ and $Y_2$ to which the phase reference signals have been added by the adders 814 and 816 are supplied to the SV recording process circuits 826 and 827 after passing through LPFs 802 and 805 each of which has a passing frequency band of about 6 MHz and gamma correction ($\gamma_Y$) circuits 821 and 823.

The gamma correction circuits 821 and 823 act to gamma-correct the transmission path for the purpose of improving the signal-to-noise ratio in dark portions of a luminance signal and establishing compatibility with the conventional SV format.

As for signal C, the signals R and B output from the imaging portion 801 pass through LPFs 804 and 807, each having a passing frequency band of 1 MHz, before supplied to switch circuits $S_1$ and $S_2$. The switch circuits $S_1$ and $S_2$ are arranged to be switched on/off every 1H so that color line-sequential signals R/B (the output of the switch circuit $S_1$) and B/R (the output of the switch circuit $S_2$) are obtained. Subtracters 809 and 810 subtract the signal $Y_1$ output from the LPF 803 having a passing frequency band of 1 MHz and the signal $Y_2$ output from the LPF 806 having a passing frequency band of 1 MHz from the output signals of the switch circuits $S_1$ and $S_2$, respectively. As a result, a color-difference line-sequential signal $C_R/C_B$ is output from the subtracter 809, while a color-difference line-sequential signal $C_B/C_R$ is output from the subtracter 810.

Figure 7:
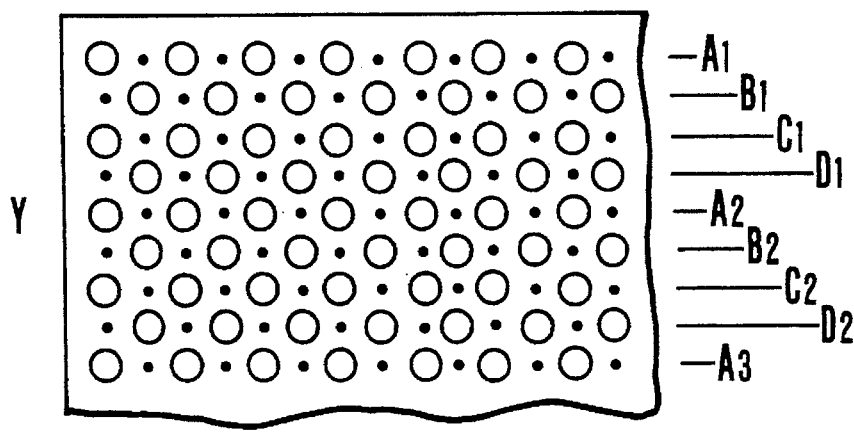
FIGS. 7(a), 7(b) and 7(c) illustrate the sample points for the signals Y and C to be recorded on the recording medium.
Figure 7:
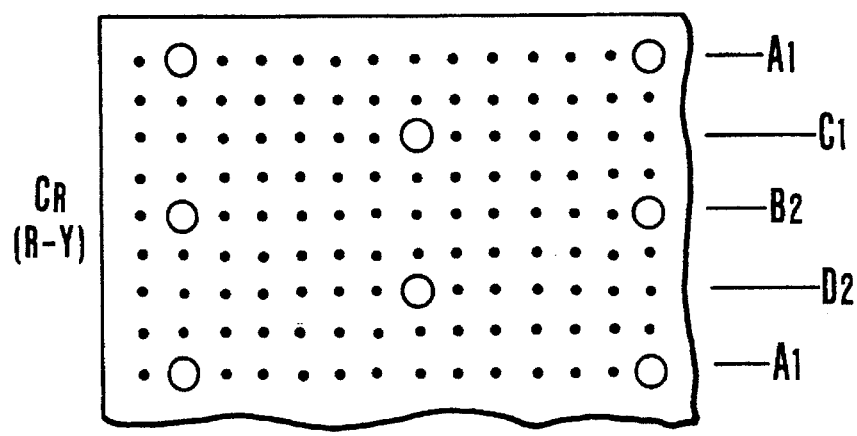
Figure 7:
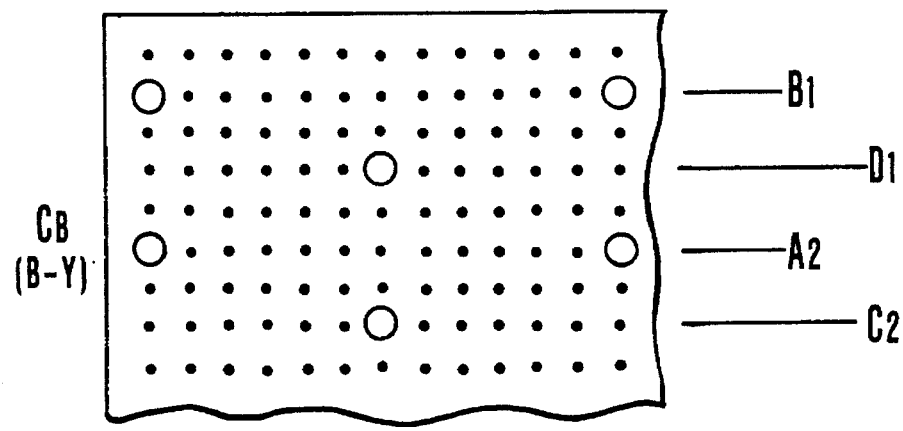

Then, the output signals $C_R/C_B$ and $C_B/C_R$ are sampled in sample-and-hold circuits 811 and 812 so as to form the sample patterns for $C_R$ and $C_B$ as shown in FIGS. 7(b) and 7(c) before supplied to adders 815 and 817. The sampling clock in this operation is supplied from the clock generating portion 813.

Figure 21:
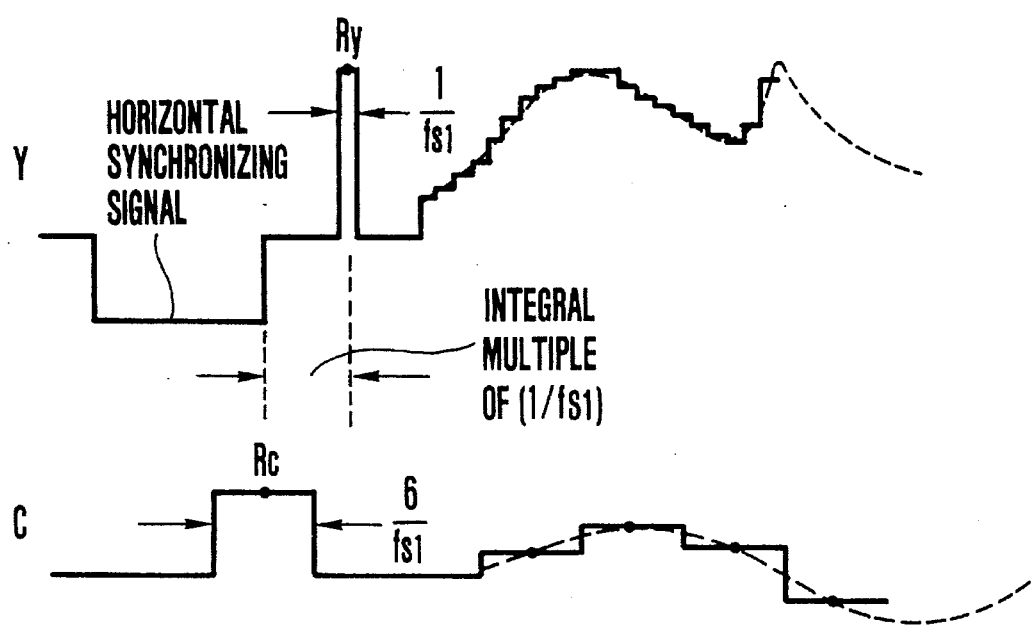
FIG. 21 illustrates the relationship between the phase reference signal for the signal Y and that for the signal C.

In the adders 815 and 817, the phase reference signal is added similarly to the case for the signal Y (although it is not necessary for the phase reference point $R_c$ for the signal C to be the same position as that of the phase reference point $R_y$ for the signal Y, the width of the pulse of the phase reference signal for the signal C must be six times the pulse width of the signal Y, see FIG. 21).

Signals output from the adders 815 and 816 pass through LPFs 819, 820 and gamma correction ($\gamma_c$) circuits 822 and 824 before supplied to the SV recording process circuits 826 and 827.

Figure 13:
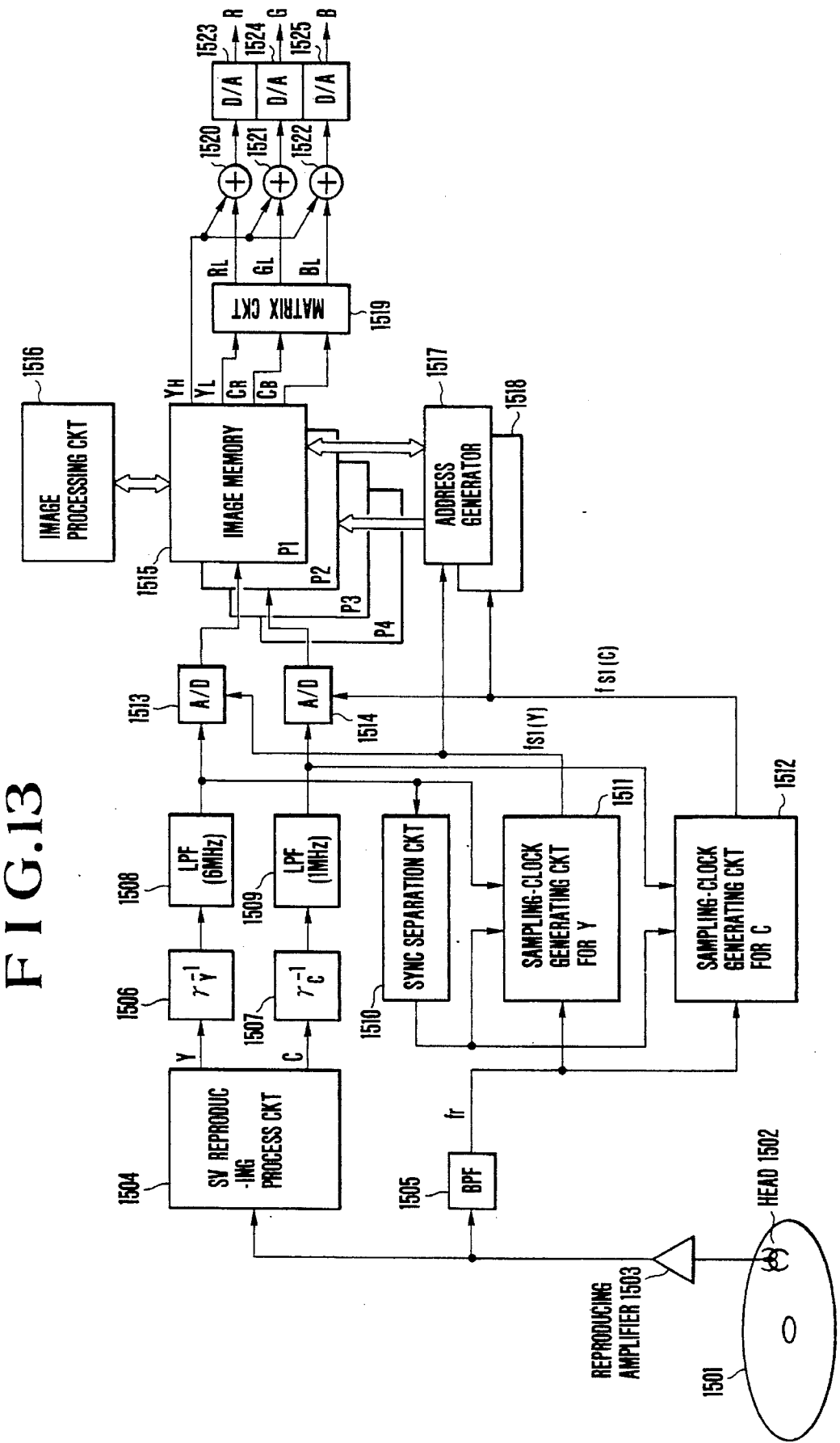
FIG. 13 illustrates the schematic structure of an electronic still video system arranged in accordance with a CHSV method.
Figure 14A:
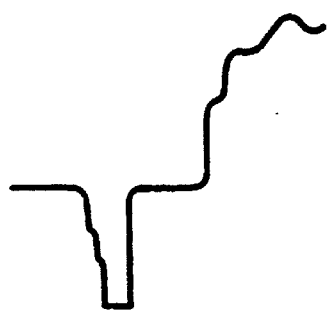
FIGS. 14(a) and 14(b) illustrate the deterioration in the waveform of a horizontal synchronizing signal generated in the reproducing mode.
Figure 14B:
Figure 22:
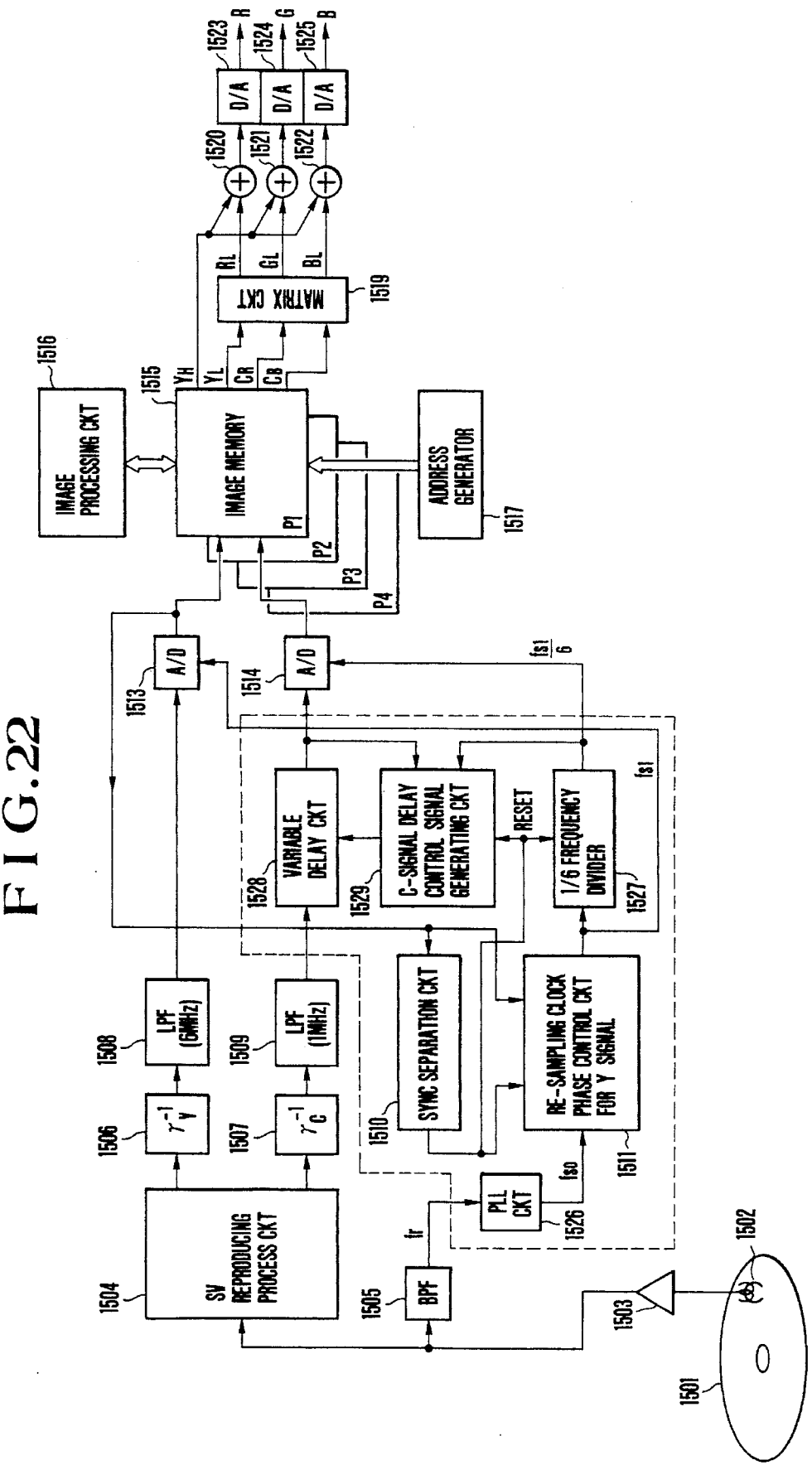
FIG. 22 is a block diagram which illustrates the schematic structure of an essential portion of the image signal reproducing apparatus according to the second embodiment of the present invention and based on the CHSV method.

FIG. 22 is a block diagram which schematically illustrates an essential portion of the image signal reproducing apparatus based on the CHSV method according to the second embodiment of the present invention. The same elements as those shown in FIG. 13 are given the same reference numerals. Referring to FIG. 22, a signal reproduced from a magnetic disk 1501 by a magnetic head 1502 passes through a preamplifier 1503 before supplied to both an SV reproducing process circuit 1504 and a BPF 1505.

In the SV reproducing process circuit 1504, signals FM-Y and FM-C (see FIG. 5) are frequency-separated from the supplied reproduced signal so as to subject them to the FM demodulation and deemphasis. As a result, reproduced signals Y and C are output from the SV reproducing process circuit 1504.

Gamma-inverse correction ($_\gamma Y^{-1}$) circuit 1506 and a gamma-inverse correction ($_\gamma C^{-1}$) circuit 1507 act to restore the signals which have been subjected to the transmission path $_\gamma Y$ and $_\gamma C$ corrections in the recording mode. The signal Y and the signal C corrected by the correction ($_\gamma Y^{-1}$) circuit 1506 and the correction ($_\gamma C^{-1}$) circuit 1507 and having passed through the LPFs 1508 and 1509 are supplied to an A/D converter 1513 and a variable delay circuit 1528, respectively.

Then, a method of generating the re-sampling clock in the reproducing mode will be described.

Pilot signal $f_r$ for the reproducing TBC separated from the reproduced signal by the BPF 1505 is supplied to a PLL (Phase-Locked Loop) circuit 1526. In the PLL circuit 1526, clock $f_{so}$, the phase of which is synchronized with the phase of the pilot signal $f_r$ and having the same frequency as that of the re-sampling clock for the signal Y, is generated and output.

A re-sampling clock phase control circuit 1511 for the signal Y controls the phase of the re-sampling clock $f_{so}$ obtained as described above. As a result, the re-sampling clock phase control circuit 1511 for the signal Y outputs, as shown in FIG. 21, a re-sampling clock $f_{s1}$ the phase of which has a predetermined relationship with the phase reference point for the aforesaid sampling phase reference signal for the signal Y added to the reproduced signal Y.

Figure 23:
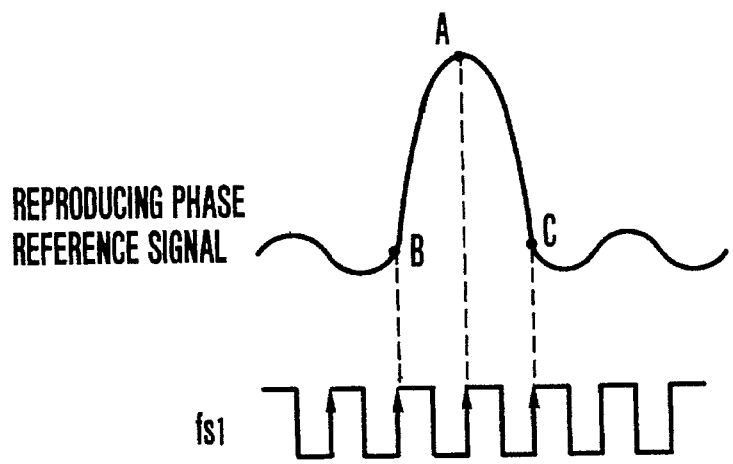
FIG. 23 illustrates the relationship between a reproducing phase reference signal and a re-sampling clock for the signal Y.
Figure 24A:
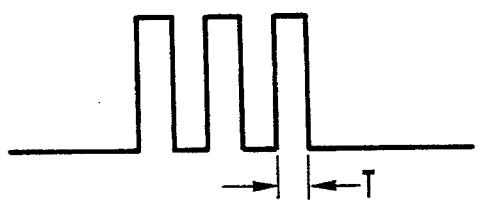
FIGS. 24(a), 24(b), 24(c) and 24(d) illustrate modifications of the waveforms of the phase reference signal according to the present invention.
Figure 24B:
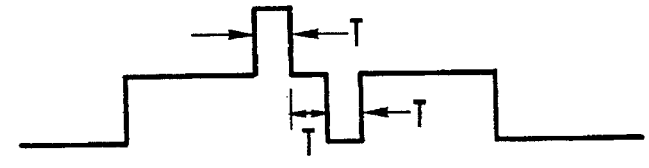
Figure 24C:
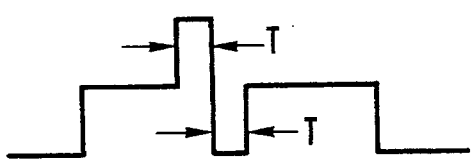
Figure 24D:
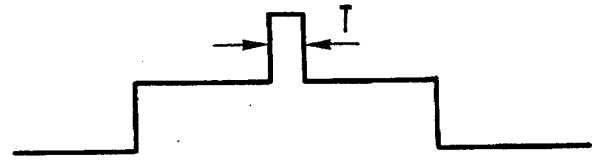

For example, as shown in FIG. 23, the re-sampling clock $f_{s1}$ for the signal Y is controlled in such a manner that the peak point for the reproducing phase reference signal and the phase of the sampling clock $f_{s1}$ for the signal Y are allowed to coincide with each other.

As for the signal C, a clock ($f_{s1}/6$) obtained by dividing the aforesaid clock $f_{s1}$ by a ⅙ frequency divider 1527 is used as the re-sampling clock (the ⅙ frequency divider 1527 is reset at the fall edge of the synchronizing signal). The delay of the signal C output from the LPF 1509 is controlled by the variable delay circuit 1528 the delay time of which is controlled by a C-signal delay control signal generating circuit 1529 so that the relationship between the phase of the re-sampling clock ($f_{s1}/6$) for the signal C and the phase of the re-sampling phase reference point is made constant. Then, the signal C is supplied to an A/D converter 1514.

In the A/D converters 1513 and 1514 shown in FIG. 22, the signals Y and C are A/D-converted and written into an image memory 1515 by using the sampling clock generated as described above. The writing address for the image memory 1515 is generated by an address generator 1517.

Figure 6A:
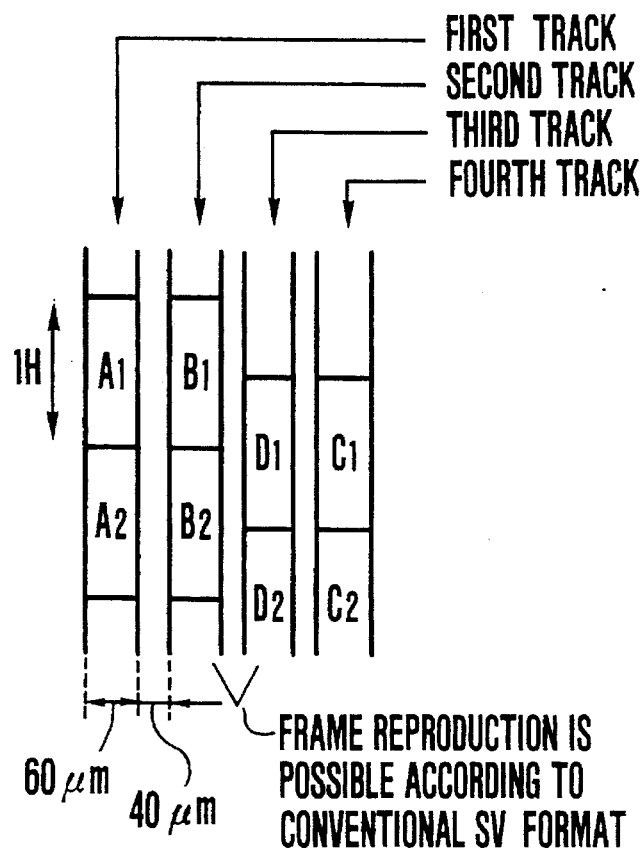
FIGS. 6(a) and 6(b) illustrate the recording track pattern in the recording medium.
Figure 6B:
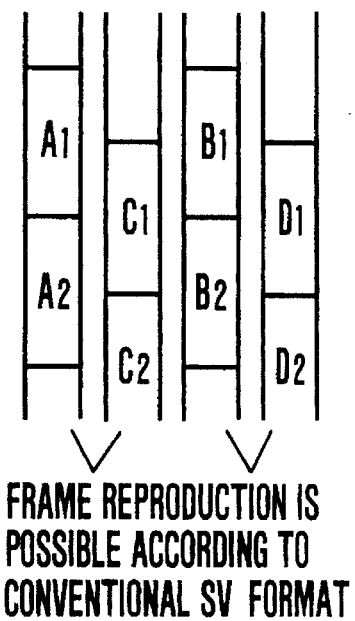

In the CHSV reproducing apparatus shown in FIG. 22 the reproducing operation as described above is subjected to all of the four tracks (the first to fourth tracks) shown in FIGS. 6(a) and 6(b) so that all of the sample values recorded on the four tracks on the magnetic disk 1501 are stored in the image memory 1515 shown FIG. 22.

Then, in an image processing circuit 1516, an interpolation and rearrangement of data for the signal C are performed by using the sample value data stored in the image memory 1515. The signal Y is subjected to an LPF processing in which the low-frequency component of the two-dimensional spatial frequency is extracted by using a two-dimensional digital filter so that $Y_L$ is obtained. Then, a subtraction ($Y-Y_L$) is performed so that high-frequency component $Y_H$ of the sample value data for the signal Y is obtained. As a result, four kinds of data $Y_H$, $Y_L$, $C_R$ and $C_B$ exist in the image memory 1515.

After the process described above has been completed, data in the image memory 1515 is read out at a predetermined clock rate in a predetermined sequential order in accordance with the reading address specified by the address generator 1517.

Thus, the signals $Y_L$, $C_R$ and $C_B$ of the signals $Y_H$, $Y_L$, $C_R$ and $C_B$ read from the image memory 1515 are converted into signals $R_L$, $G_L$ and $B_L$ in a matrix circuit 1519. In adders 1520 to 1522, the signals $R_L$, $G_L$ and $B_L$ are added to the signal $Y_H$ so that signals ($R_L+Y_H$), ($G_L+Y_H$) and ($B_L+Y_H$) are output from the adders 1520, 1521 and 1522.

Signals output from the adders 1520, 1521 and 1522 are converted into analog signals by D/A converters 1523 to 1525 so as to be output in the form of the signals R, G and B.

As described above, this embodiment according to the present invention is arranged in such a manner that one phase reference signal as shown in FIG. 21 is added every 1H (horizontal scanning period). However, the phase reference signal may be added to a proper timing in the vertical blanking period in a case where it is added every 1V (vertical scanning period).

As the phase reference signal, a variety of waveforms as shown in FIGS. 24(a), 24(b), 24(c) and 24(d) may be employed as an alternative to the rectangular pulse.

As described above, according to this embodiment, information indicative of the phase reference of the re-sampling operation performed in the reproducing mode is, together with the image signal, recorded on the magnetic disk. Therefore, the re-sampling phase can be automatically adjusted for each of the magnetic disks in the CHSV method reproducing apparatus.

Therefore, the necessity of adjusting the re-sampling phase for the reproducing apparatus for each of the magnetic disk, on which information has been recorded by difference CHSV cameras, can be eliminated.

According to this embodiment, the pilot signals for TBC are successively multiplexed with the image signal in the recording mode so as to be recorded. However, it may be multiplexed onto at least one of the horizontal and vertical blanking periods for the image signal so as to be recorded. As a result, generation of moiré or the like in the image signal can be prevented.

As described above, according to the structure described with reference to the embodiment, precise image signals can be stably recorded and reproduced from a recording medium without any deterioration.

Although the invention has been described in its preferred form with a certain degree of particularly, it is understood that the present disclosure of the preferred form may be changed in the details of construction and the combination and arrangement of parts without departing from the spirit and the scope of the invention as hereinafter claimed.

What is claimed is:

1. A color image signal recording apparatus for recording a color image signal including a color burst signal, horizontal and vertical synchronizing signals and having a blanking portion on a recording medium, comprising:

(A) generating means arranged to input the image signal and to generate a sampling clock signal which is synchronized with the horizontal and vertical synchronizing signals in the color image signal, and a one pulse signal which is different from the color burst signal, the horizontal and vertical synchronizing signals included in the color image signal and which indicates a reference phase synchronized in phase with the sampling clock signal, and a pilot signal which is different from the color burst signal, the horizontal and vertical synchronizing signals and the one pulse signal and which has a single frequency;

(B) sampling color image signal forming means arranged to input the color image signal and to effect sampling of the input color image signal in synchronism with the sampling clock signal generated by said generating means, thereby forming and outputting a sampling color image signal;

(C) processing means for adding the one pulse signal generated by said generating means to the sampling color image signal outputted from said sampling color image signal forming means at a portion of said sampling color image signal which corresponds to the vertical blanking portion of the color image signal and continuously frequency-multiplexing the pilot signal generated by said generating means to the sampling color image signal outputted from said sampling color image signal forming means; and (D) recording means for recording on said recording medium the sampling color image signal outputted from said processing means.

2. A color image signal reproducing apparatus for reproducing a color image signal from a recording medium, comprising:

(A) reproducing means for reproducing a sampling color image signal from the recording medium on which the color image signal is recorded and for outputting the signal as a reproduced sampling color image signal, the sampling color image signal being formed by sampling a color image signal including a color burst signal, horizontal and vertical synchronizing signals in synchronism with a sampling clock signal, a portion of the sampling color image signal which corresponds to the vertical blanking portion of the color image signal being added to a one pulse signal which is different from the color burst signal, the horizontal and vertical signals included in the color image signal and which indicates a reference phase synchronized in phase with the sampling clock signal, and further the sampling color image signal being continuously frequency-multiplexed with a pilot signal which is different from the color burst signal, the horizontal and vertical synchronizing signals and the one pulse signal and which has a single frequency;

(B) one pulse signal separating means for separating the one pulse signal from the reproduced sampling color image signal outputted from the reproducing means;

(C) pilot signal separating means for separating the pilot signal from the reproduced sampling color image signal outputted from said reproducing means;

(D) re-sampling clock signal generating means for generating a re-sampling clock signal for re-sampling the reproduced sampling color image signal outputted from said reproducing means, the re-sampling clock signal being synchronized in phase with the pilot signal frequency-multiplexed with the reproduced sampling color image signal; and (E) phase control means for controlling a phase of the re-sampling clock signal generated by said re-sampling clock signal generating means in accordance with the one pulse signal outputted from said one pulse signal separating means.

3. An apparatus according to claim 2, further comprising:

(F) re-sampling image signal forming means for re-sampling the reproduced sampling color image signal outputted from said reproducing means in synchronism with the re-sampling clock signal outputted from said phase control means, thereby forming and outputting a re-sampling color image signal; and (G) memory means for storing the re-sampling color image signal outputted from said re-sampling color image signal forming means.

4. An apparatus according to claim 3, wherein said memory means includes (1) a memory circuit for storing the re-sampling color image signal output from said re-sampling color image signal forming means; and (2) a memory control circuit arranged to successively assign a writing address for the re-sampling color image signal, to store the re-sampling color image signal in said memory circuit and to read out the re-sampling color image signal stored in said memory circuit in synchronism with an accurate clock signal.

5. An apparatus according to claim 4, wherein said memory control circuit is arranged to reset the writing address assigned to said memory circuit in accordance with the one pulse signal output from said one pulse signal separating means.

* * * * *

UNITED STATES PATENT AND TRADEMARK OFFICE
CERTIFICATE OF CORRECTION

PATENT NO. : 5,568,276
DATED : October 22, 1996
INVENTOR(S) : Kazuhito Ohashi

It is certified that error appears in the above-indentified patent and that said Letters Patent is hereby corrected as shown below:

On the cover page, after Item [22], insert

--[30] Foreign Application Priority Data

July 25, 1989      [JP] Japan..............................01-193093
November 10, 1989 [JP] Japan............................01-291299--.

Signed and Sealed this

Fourteenth Day of October, 1997

*Attest:*

BRUCE LEHMAN

*Attesting Officer*      *Commissioner of Patents and Trademarks*